US010228895B2

(12) United States Patent
Miyajima et al.

(10) Patent No.: US 10,228,895 B2
(45) Date of Patent: Mar. 12, 2019

(54) IMAGE DISPLAY DEVICE, IMAGE DISPLAY METHOD, AND COMPUTER PROGRAM

(71) Applicant: Sony Corporation, Tokyo (JP)

(72) Inventors: Yasushi Miyajima, Kanagawa (JP); Yoichiro Sako, Tokyo (JP); Motoyuki Takai, Tokyo (JP); Hiroshi Mukawa, Kanagawa (JP); Tatsuya Narahara, Kanagawa (JP); Masashi Takeda, Tokyo (JP); Hiroaki Ogawa, Chiba (JP); Seiji Wada, Kanagawa (JP); Ichigo Hayakawa, Tokyo (JP); Akira Tange, Tokyo (JP); Takao Tanikame, Kanagawa (JP); Kazuhide Kemmochi, Tokyo (JP)

(73) Assignee: Sony Corporation (JP)

( * ) Notice: Subject to any disclaimer, the term of this patent is extended or adjusted under 35 U.S.C. 154(b) by 346 days.

(21) Appl. No.: 14/066,814

(22) Filed: Oct. 30, 2013

(65) Prior Publication Data
US 2014/0125558 A1 May 8, 2014

(30) Foreign Application Priority Data

Nov. 6, 2012 (JP) ................... 2012-244878

(51) Int. Cl.
G09B 3/04 (2006.01)
G09B 7/02 (2006.01)
(Continued)

(52) U.S. Cl.
CPC ........... G06F 3/147 (2013.01); G02B 27/017 (2013.01); G06F 17/289 (2013.01); G09B 3/045 (2013.01);
(Continued)

(58) Field of Classification Search
None
See application file for complete search history.

(56) References Cited

U.S. PATENT DOCUMENTS 7,298,384 B2 11/2007 Anabuki et al.
8,963,806 B1 * 2/2015 Starner .................... G09G 5/00
345/7
(Continued)

FOREIGN PATENT DOCUMENTS

JP H10153946 A 6/1998
JP 2000020196 A 1/2000
(Continued)

OTHER PUBLICATIONS

Japanese Office Action for JP Application No. 2012244878, dated Dec. 1, 2015.

Primary Examiner — Stephen T. Reed
(74) Attorney, Agent, or Firm — Lerner, David, Littenberg, Krumholz & Mentlik, LLP

(57) ABSTRACT

An image display device which is used by being mounted on the head or face of a user includes a display unit which displays an image; an information maintaining unit which maintains user information of the user; a region specifying unit which specifies an attention region from a field of vision of the user based on the user information; an image processing unit which performs image processing with respect to the attention region; and a display control unit which displays the attention region after being subjected to the image processing on the display unit.

21 Claims, 28 Drawing Sheets

(51) Int. Cl.
*G02B 27/01* (2006.01)
*G06F 17/21* (2006.01)
*G06F 17/28* (2006.01)
*G06F 3/147* (2006.01)

(52) U.S. Cl.
CPC .......... *G09B 7/02* (2013.01); *G02B 2027/014* (2013.01); *G02B 2027/0112* (2013.01); *G02B 2027/0132* (2013.01); *G02B 2027/0141* (2013.01); *G02B 2027/0187* (2013.01); *G06F 17/214* (2013.01)

(56) References Cited

U.S. PATENT DOCUMENTS

| | | | |
|---|---|---|---|
| 2002/0138249 A1* | 9/2002 | Kanevsky | G02B 27/017 704/2 |
| 2005/0259035 A1* | 11/2005 | Iwaki | G06F 3/011 345/8 |
| 2006/0015342 A1* | 1/2006 | Kurzweil | G09B 21/006 704/260 |
| 2010/0085462 A1 | 4/2010 | Sako et al. | |
| 2010/0245042 A1* | 9/2010 | Tsubaki | G06F 21/32 340/5.82 |
| 2011/0159921 A1* | 6/2011 | Davis | H04M 1/72569 455/556.1 |
| 2011/0214082 A1 | 9/2011 | Osterhout et al. | |
| 2011/0242311 A1* | 10/2011 | Miyajima | G01C 21/3602 348/116 |
| 2012/0044571 A1* | 2/2012 | Mukawa | G02B 27/0103 359/630 |
| 2012/0154557 A1 | 6/2012 | Perez et al. | |
| 2013/0106674 A1* | 5/2013 | Wheeler | G02B 27/017 345/8 |
| 2013/0335404 A1* | 12/2013 | Westerinen | G06F 3/033 345/419 |
| 2014/0063055 A1* | 3/2014 | Osterhout | G06F 3/005 345/633 |

FOREIGN PATENT DOCUMENTS

| | | |
|---|---|---|
| JP | 2001-056446 A | 2/2001 |
| JP | 2001273526 A | 10/2001 |
| JP | 2003-215494 A | 7/2003 |
| JP | 2006072876 A | 3/2006 |
| JP | 2006309314 A | 11/2006 |
| JP | 2008054236 A | 3/2008 |
| JP | 2008096867 A | 4/2008 |
| JP | 2008227813 A | 9/2008 |
| JP | 2010055353 A | 3/2010 |
| JP | 2012-059121 A | 3/2012 |
| JP | 2012133659 A | 7/2012 |
| JP | 2014504413 A | 2/2014 |
| WO | 2006064655 A1 | 6/2006 |
| WO | 2011106798 A1 | 9/2011 |
| WO | 2012082444 A1 | 6/2012 |

\* cited by examiner

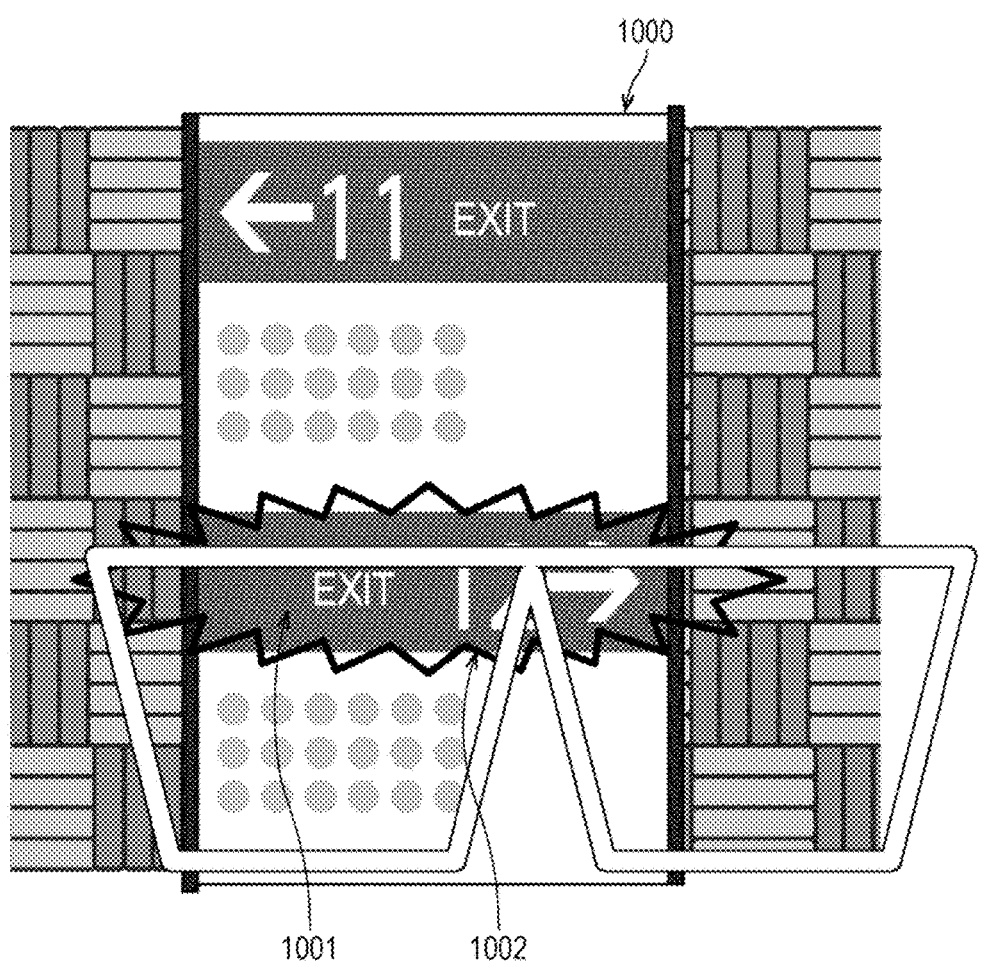

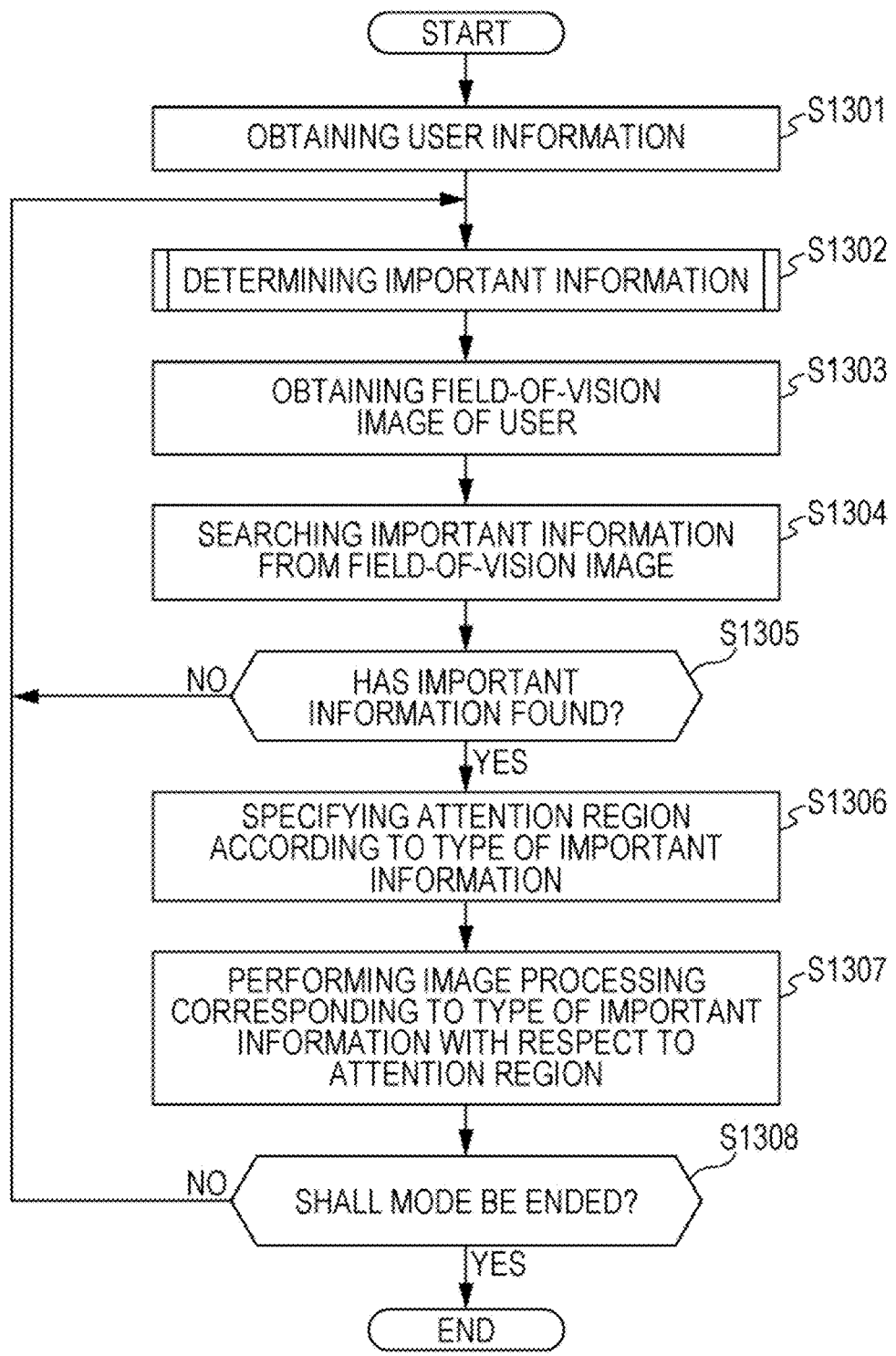

FIG. 15
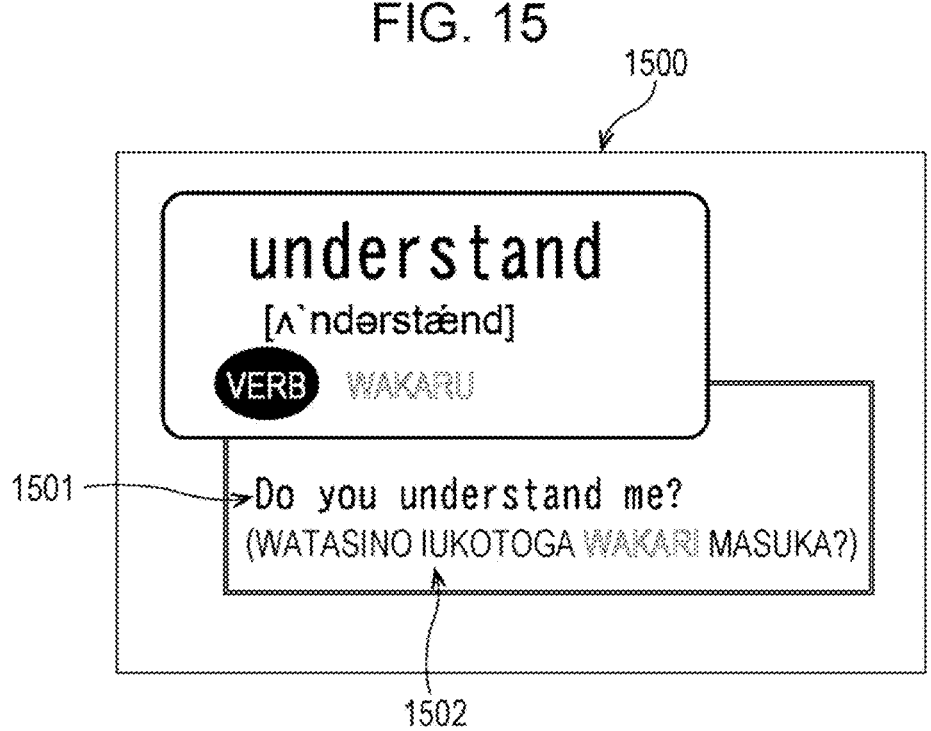
OVERLAPPING COLORED CELLOPHANE SHEET
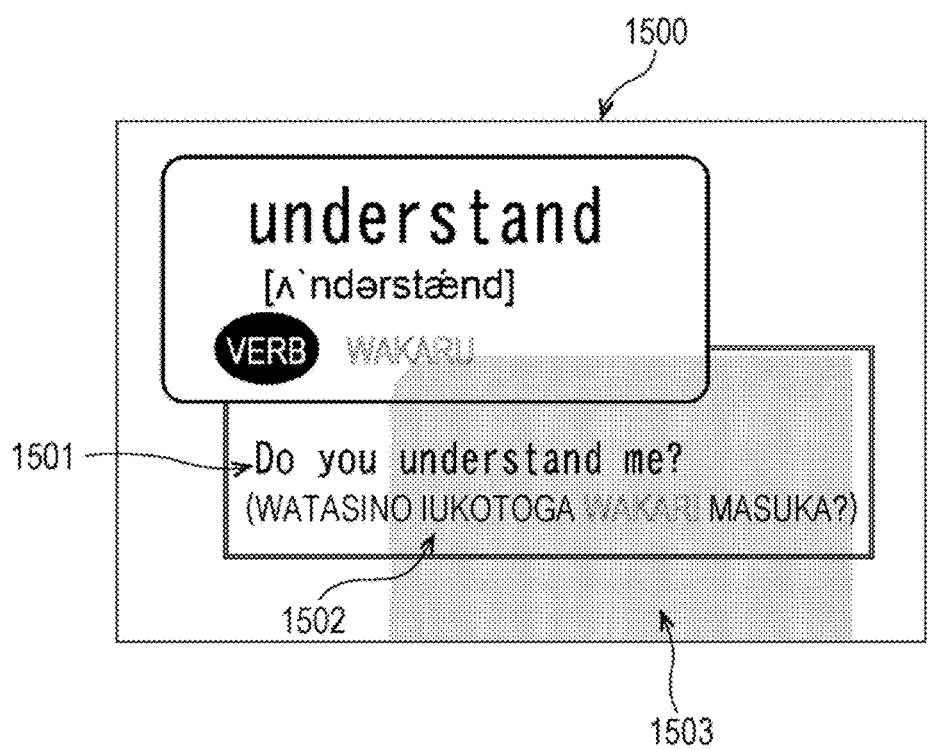

VIEWING IMAGE WHEN VIEWED USING BOTH EYES

VIEWING IMAGE WHEN VIEWED USING ONE EYE

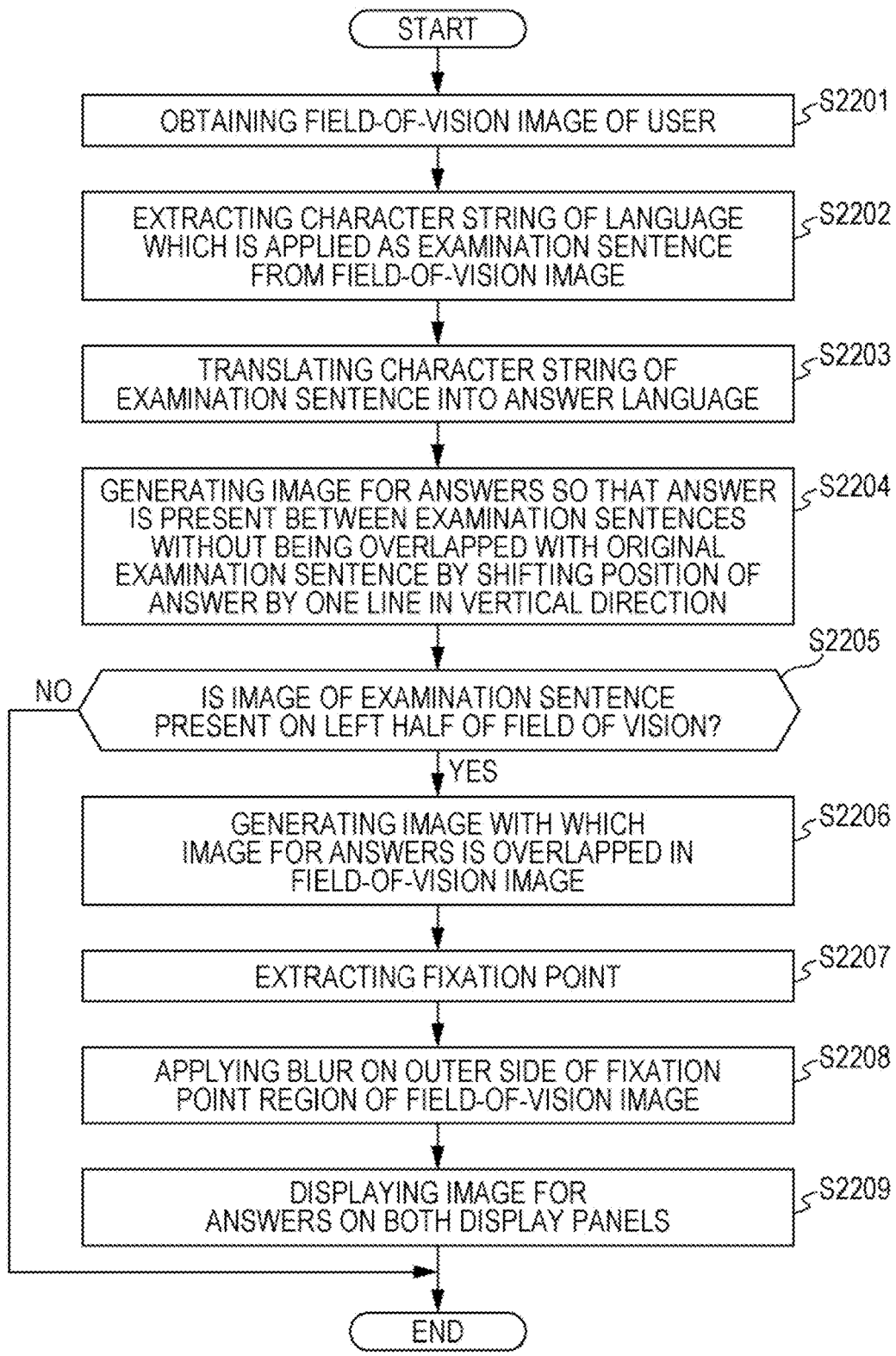

IMAGE DISPLAY DEVICE, IMAGE DISPLAY METHOD, AND COMPUTER PROGRAM

CROSS REFERENCE TO RELATED APPLICATIONS

This application claims the benefit of Japanese Priority Patent Application JP 2012-244878 filed Nov. 6, 2012, the entire contents of which are incorporated herein by reference.

BACKGROUND

A technology which is disclosed in the specification relates to an image display device which is used when a user wears the device on the face or the head, and views an image, an image display method thereof, and a computer program. In particular, the technology relates to an image display device in which a virtual display image is viewed by being overlapped with a real world scenery, an image display method thereof, and a computer program.

A head-mounted image display device which is used when viewing an image by wearing the device on the head, that is, a head-mounted display has been known. The head-mounted image display device includes, for example, image display units for respective left and right eye, and is configured so as to control sight and hearing by using headphones together. In addition, the head-mounted image display device is capable of projecting images which are different in the left and right eyes, and providing a 3D image when displaying an image with parallax in the left and right eyes.

It is also possible to classify the head-mounted image display device into a light blocking type and a transmission type. A light blocking-type head-mounted image display device is configured so as to directly cover user's eyes when being mounted on the head, and a level of concentration of a user increases when seeing and hearing an image. On the other hand, in a case of a transmission-type head-mounted image display device, a user is able to see an outside view (that is, see through) beyond an image while the image is being displayed by mounting the device on the head. Accordingly, it is possible to display a virtual display image by overlapping the image with a real world scenery. Naturally, also in the light blocking-type head-mounted image display device, it is possible to display the same image for a user when a composition process is performed so that an image of a camera which photographs the outside scenery is overlapped with a virtual display image.

For example, a head-mounted display device in which character data is extracted from a designated region which is designated when a user moves a cursor on a real image using a line of sight, and characters which are generated based on a translation result of the character data are shown at a designated portion such as the upper right corner, or the lower left corner of a virtual screen has been proposed (for example, refer to Japanese Unexamined Patent Application Publication No. 2001-56446). However, in the head-mounted display device, a user himself should perform input operations of processes which are applied to a designated region such as a type of a target language of character data, a character type, and a character style. In addition, since the character after the translation as a processing result is arranged at a place excluding the original designated region, it is not possible for a user to view the processing result, if the user does not take his eyes off of the designated region. In addition, when a translated character string is overlapped with a place which is different from the designated region of the real image, it is considered that a sense of reality decreases.

In addition, a glasses-type display device in which a sound signal of a speaker is specified and extracted based on face image data of the speaker in an imaged field of vision, face characteristic data, and a sound signal of ambient sound, and text data thereof is translated into another language, and is overlappingly displayed in the field of vision has been proposed (for example, Japanese Unexamined Patent Application Publication No. 2012-59121).

In addition, a telescope-type mixed reality presentation device in which virtual space image data in which a scene of building a virtual structure in a scenery in front of eyes is simulated is composited without being deviated from a real space image has been proposed (for example, refer to Japanese Unexamined Patent Application Publication No. 2003-215494).

As described above, the head-mounted image display device in the related art is capable of presenting virtual information such as translated sentences of text data which is extracted from a real image, a sound of a speaker, or the like, and a virtual space image which is simulated by computer graphics, or the like, to a user. However, pieces of information which are asked for from a user who is wearing the device, or are necessary for the user are various. In a field of sight, a user not necessarily keeps a close eye on an object which presents information necessary for the user. In addition, information to be presented to an object, or a presentation method thereof is various in each user, and may be changed according to a surrounding environment, or a user's state, even in the same user.

SUMMARY

It is desirable to provide an excellent image display device which is used when a user wears the device on the head, and views an image, and capable of displaying a virtual display image by overlapping the image with a real world scenery, an image display method thereof, and a computer program.

An image display device according to an embodiment of the present technology, which is used by being mounted on a head or a face of a user, includes a display unit which displays an image; an information maintaining unit which maintains user information of the user; a region specifying unit which specifies an attention region from a field of vision of the user based on the user information; an image processing unit which performs image processing with respect to the attention region; and a display control unit which displays the attention region after being subjected to the image processing on the display unit.

In the image display device according to the embodiment, when the display unit is a transmission type, the display control unit displays the attention region after being subjected to the image processing on the display unit so as to overlap with a real attention region in a field of vision of the user which is transmitted. In addition, when the display unit is a light blocking type, the image display device further includes an image obtaining unit which obtains a field-of-vision image of the user, and the display control unit displays the attention region after being subjected to the image processing on the display unit so as to overlap with an attention region in the field of vision image.

In the image display device according to the embodiment, the information maintaining unit may maintain a line of sight position of the user as the user information, and the region specifying unit may specify the attention region based on the line of sight position of the user.

In the image display device according to the embodiment, the region specifying unit may specify a character string which is written in a source language, and is in front of the line of sight of the user as an attention region, the image processing unit may translate the character string into a language which is determined based on the user information, and the display control unit may display the original character string in the attention region by substituting to a character string which is translated.

In the image display device according to the embodiment, the image processing unit may generate an image to be substituted in the original attention region by attaching the translated character string onto a background image on which the character string before translating is painted out using peripheral color or texture, and the display control unit may display the image which is generated in the image processing unit so as to overlap with the original attention region in the field of vision of the user.

In the image display device according to the embodiment, the image processing unit may generate the substitution image in the attention region by providing the substitution image with a translated character, color of the character before being translated, a style of font, and an inclination on the background image.

In the image display device according to the embodiment, the image processing unit may adjust a font size of the translated character string so as to be fitted into the original attention region.

In the image display device according to the embodiment, the display control unit may sequentially display the translated character string which is not fitted into the original attention region by scrolling the character string in the arranging direction of the character.

In the image display device according to the embodiment, the image processing unit may determine a target language based on a country from which the user has come, a residence of the user, a language which can be understood by the user, or a proficiency level of each language of the user.

In the image display device according to the embodiment, the image maintaining unit may maintain current location information of the user, and processes of each unit of the region specifying unit, the image processing unit, and the display control unit may be performed when the current location is determined to be another location excluding a country of residence.

In the image display device according to the embodiment, an official language of the current location may be set to a source language, and a language of the user of which a proficiency level is highest may be set to the target language.

In the image display device according to the embodiment, the information maintaining unit may maintain an action history or a memorandum of the user as the user information, and the region specifying unit may determine important information of the user based on the action history or the memorandum of the user, and may specify the attention region according to a type of the important information which is found in the field of vision of the user.

In the image display device according to the embodiment, the image processing unit may apply image processing corresponding to a type of the important information with respect to the attention region.

In the image display device according to the embodiment, the region specifying unit may determine a name of a main mark between the current location and a destination, and the mark as the important information according to current transportation means of the user when the user is moving to the destination, and does not have the feel of the place in the current location.

In the image display device according to the embodiment, the information maintaining unit may maintain a work state of the user as the user information, and the region specifying unit may specify the attention region based on the work state of the user.

In the image display device according to the embodiment, in a work state in which the user is solving problems on a workbook, the region specifying unit may specify an examination sentence in a field of vision of the user in the attention region, the image processing unit may generate an image for answers of the examination sentence, and the display control unit may display the image for answers by shifting a position of the answer from the examination sentence so as not to be overlapped with the examination sentence in the real world thereon.

In the image display device according to the embodiment, the display unit may be provided in each of the left and right eyes of the user. In addition, the display control unit may overlappingly display the image for answers only on one side of the left and right display units.

In the image display device according to the embodiment, the display unit may be provided in each of the left and right eyes of the user. In addition, the display control unit may overlappingly display the image for answers on both sides of the left and right display units when the examination sentence is present in the field of vision on one side of the left and right eyes of the user.

In the image display device according to the embodiment, the display control unit may apply a blur or a mosaic to a region excluding a fixation point region in the vicinity of a center of the image with which the image for answers is overlapped.

An image display method according to another embodiment of the present technology in which an image is displayed for a user who is wearing an image display device on the head or face includes maintaining user information of the user; specifying attention region from a field of vision of the user based on the user information; performing image processing with respect to the attention region; and display controlling of displaying the attention region after being subjected to the image processing for the user.

A computer program according to still another embodiment of the present technology which is written in a computer-readable format so that an image display device which is used by being mounted on the head or face of a user is controlled using a computer causes the computer to function as a display unit which displays an image; an information maintaining unit which maintains user information of the user; a region specifying unit which specifies an attention region from a field of vision of the user based on the user information; an image processing unit which performs image processing with respect to the attention region; and a display control unit which displays the attention region after being subjected to the image processing on the display unit.

The computer program according to the embodiment is defined as a computer program which is written in a computer-readable format so as to execute predetermined processing on a computer. In other words, when installing the computer program according to the embodiment into a computer, cooperative operations are executed on the computer, and it is possible to obtain the same operation effect as that in the image display device according to the embodiment.

According to the technology which is disclosed in the present specification, it is possible to provide a head-mounted image display device which is capable of overlappingly displaying information which is necessary for a user with respect to an attention region to which the user is paying attention in a field of vision, an image display method thereof, and a computer program.

According to the technology which is disclosed in the present specification, since a character string in an attention region which is written in another language is translated into an understandable language such as a native language, or an attention region which is apt to be overlooked is displayed by being emphasized or enlarged in a field of vision of a user which is viewed over the head-mounted image display device, the user is able to act smoothly even in a strange place.

In addition, according to the technology which is disclosed in the present specification, when a user views an examination sentence over the head-mounted image display device, it is possible to perform smooth learning by not displaying an answer when the user is solving a problem, and by overlappingly displaying the answer when the user is checking the answer.

Further another aim, characteristics, or advantages of the technology which are disclosed in the present specification may be clarified by further detailed descriptions based on embodiments, or accompanying drawings which will be described later.

BRIEF DESCRIPTION OF THE DRAWINGS

FIG. 10B is a diagram which exemplifies an image when the user wearing the transmission-type image display device is viewing the exit guidance;

FIG. 13 is a flowchart which illustrates a processing procedure for providing the above described guide sign, and an information emphasizing service by the image display device;

FIG. 15 is a diagram which exemplifies a workbook which is attached with answers using a colored cellophane sheet;

FIG. 22 is a flowchart which illustrates the processing procedure for providing the image of the examination sentence which is attached with the answer by the image display device.

DETAILED DESCRIPTION OF EMBODIMENTS

Hereinafter, embodiments of the technology which is disclosed in the present specification will be described in detail with reference to drawings.

A. Device Configuration

Figure 1:
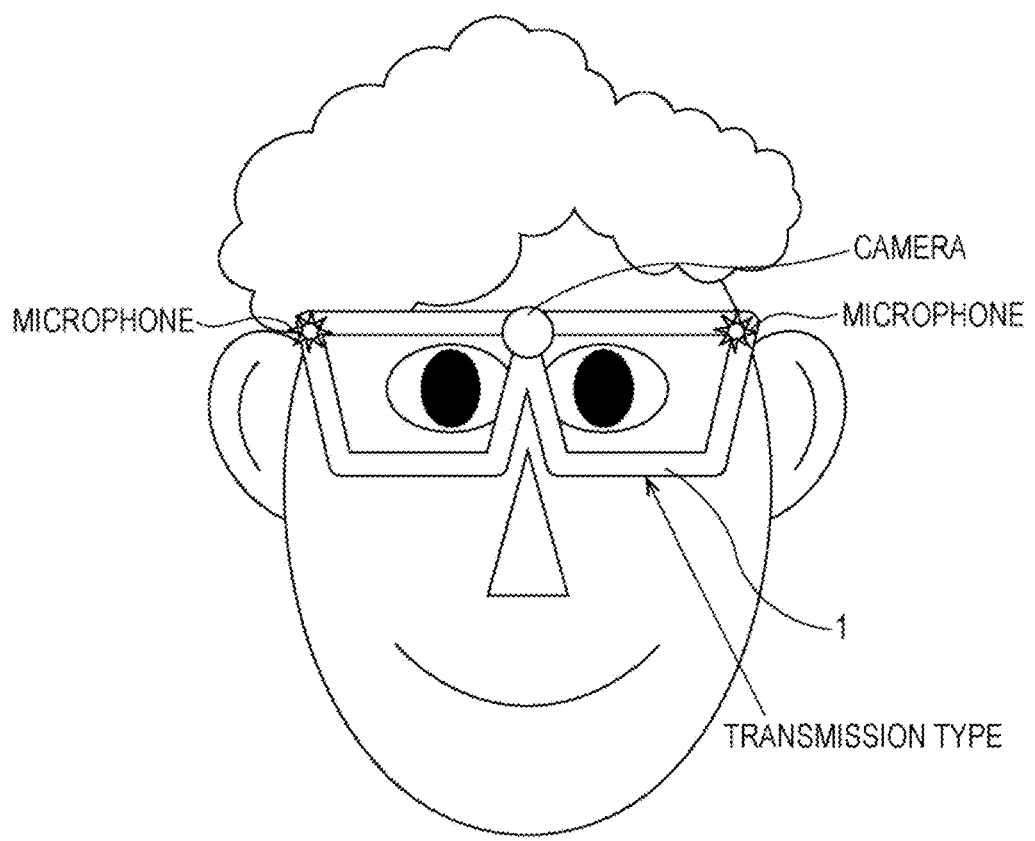
FIG. 1 is a diagram which illustrates a state in which a user wearing a transmission-type head-mounted image display device is viewed from the front.

FIG. 1 illustrates a state in which a user wearing a transmission-type, that is, a see through-type head-mounted image display device 1 is viewed from the front. The illustrated image display device 1 has a structure which is similar to glasses for eyesight correction. A virtual image optical unit which is formed by a transparent light guiding unit, or the like, is arranged at a position of a main body of the device 1 facing the left and right eyes of a user, and an image which is viewed by a user is displayed on the inner side of the virtual image optical unit. The virtual image optical unit is supported by, for example, a glasses frame-shaped supporting body.

A camera for inputting a peripheral image (field of vision of user) is provided at approximately a center of the glasses frame-shaped supporting body. In addition, microphones are respectively provided in the vicinity of both the left and right ends of the supporting body. Since there are two microphones, it is possible to separate an ambient noise or a talking voice of another person, and to prevent, for example, a malfunction at time of operating using a voice input by recognizing only a voice which is oriented in the center (voice of user).

Figure 2:
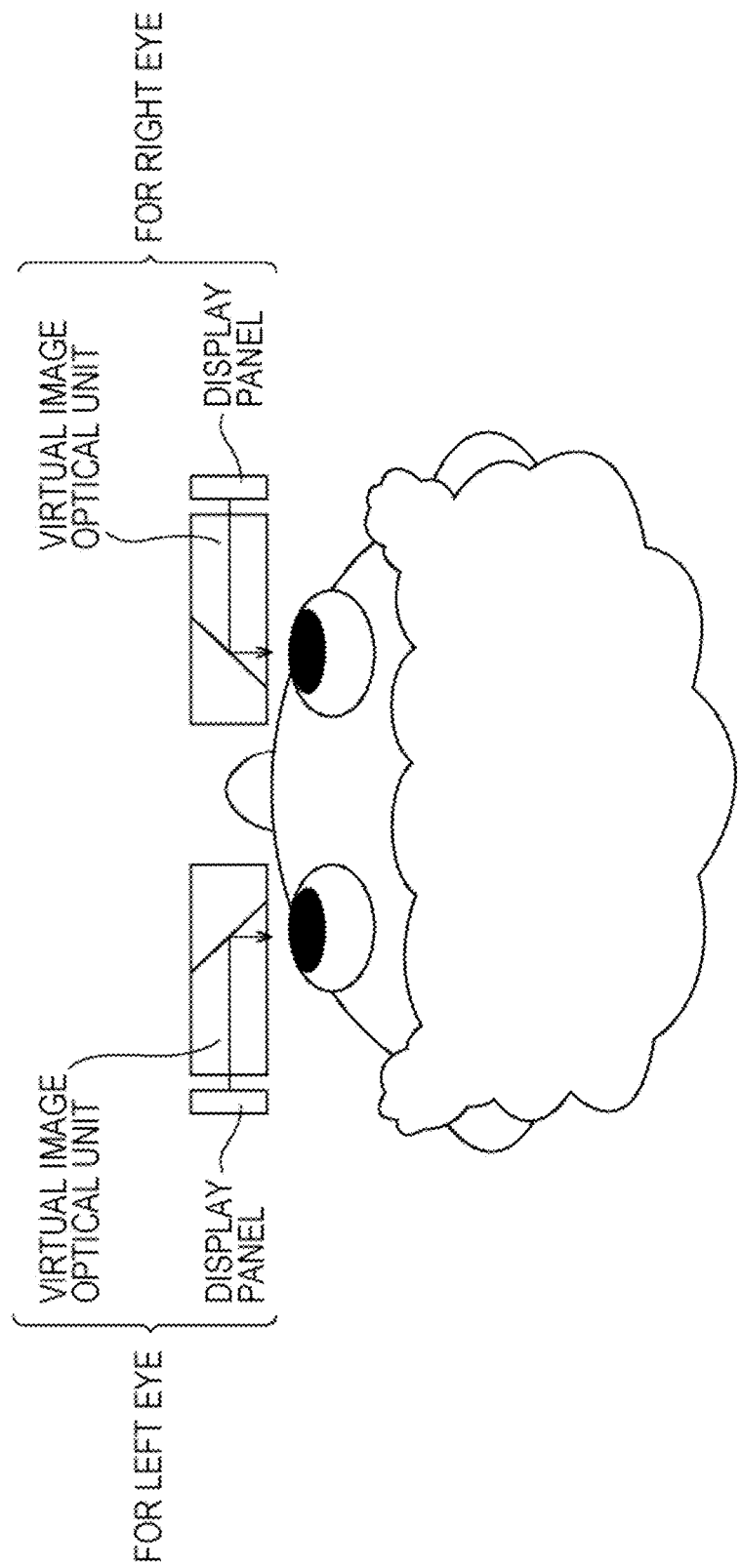
FIG. 2 is a diagram which illustrates a state in which the user wearing the image display device illustrated in FIG. 1 is viewed from the top.

FIG. 2 illustrates a state in which the image display device 1 which is worn by a user is viewed from the top. As illustrated, display panels for displaying and outputting respective a left eye image and a right eye image are arranged on both the left and right ends of the image display device 1. Each display panel is formed by a micro-display such as a liquid crystal display, or an organic EL element. The left and right display images which are output from the display panels are optically guided to the vicinity of the respective left and right eyes by the virtual image optical unit, and enlarged virtual images thereof are formed on pupils of eyes of a user.

Figure 3:
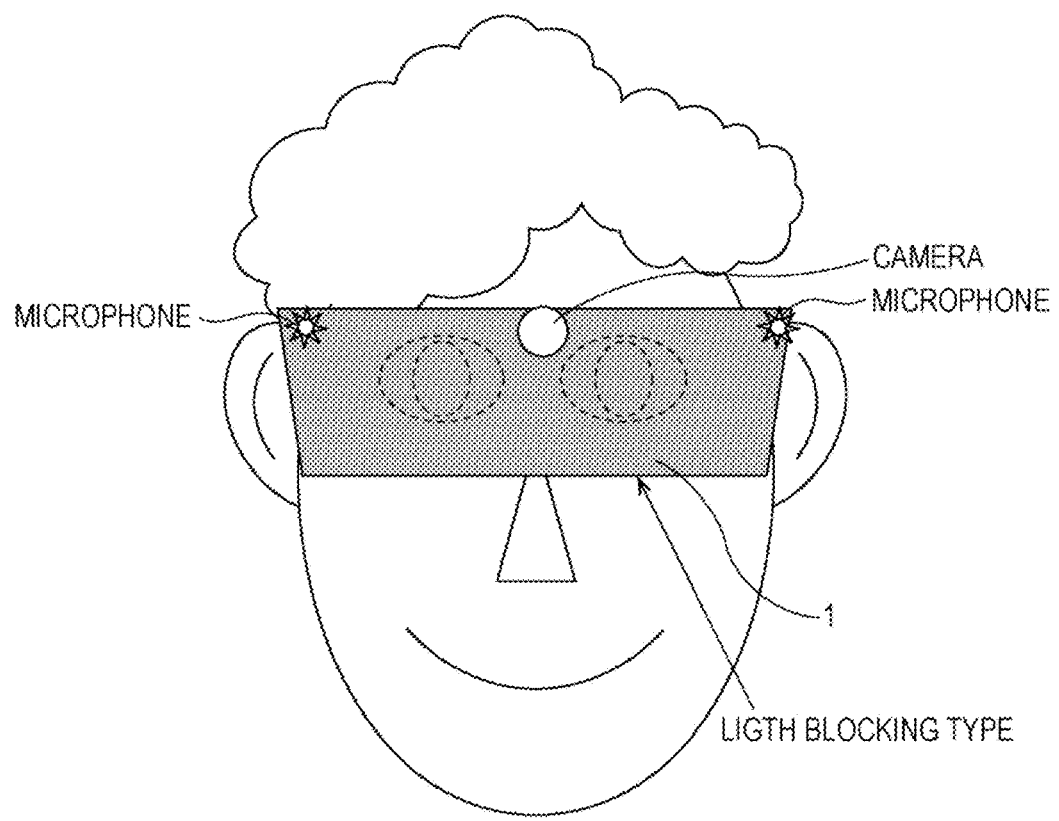
FIG. 3 is a diagram which illustrates a state in which a user wearing a light blocking-type head-mounted image display device is viewed from the front.

On the other hand, FIG. 3 illustrates a state in which a user wearing the light blocking-type head-mounted image display device 1 is viewed from the front. The illustrated image display device 1 is a structure body which is similar to a cap shape, and is configured so as to directly cover the left and right eyes of the user who is wearing the device. A display panel (not shown in FIG. 1) which is viewed by the user is arranged at a position on the inner side of the main body of the device 1, and facing the left and right eyes. The display panel is formed by a micro-display, for example, an organic EL element, a liquid crystal display, or the like.

A camera for inputting a peripheral image (field of vision of user) is provided in approximately a center of the front of the main body of the device 1 which is cap-shaped. In addition, microphones are respectively provided on both the left and right ends of the supporting body. Since there are two microphones, it is possible to separate an ambient noise or a talking voice of another person, and to prevent, for example, a malfunction at time of operating using a voice input by recognizing only a voice which is oriented in the center (voice of user).

Figure 4:
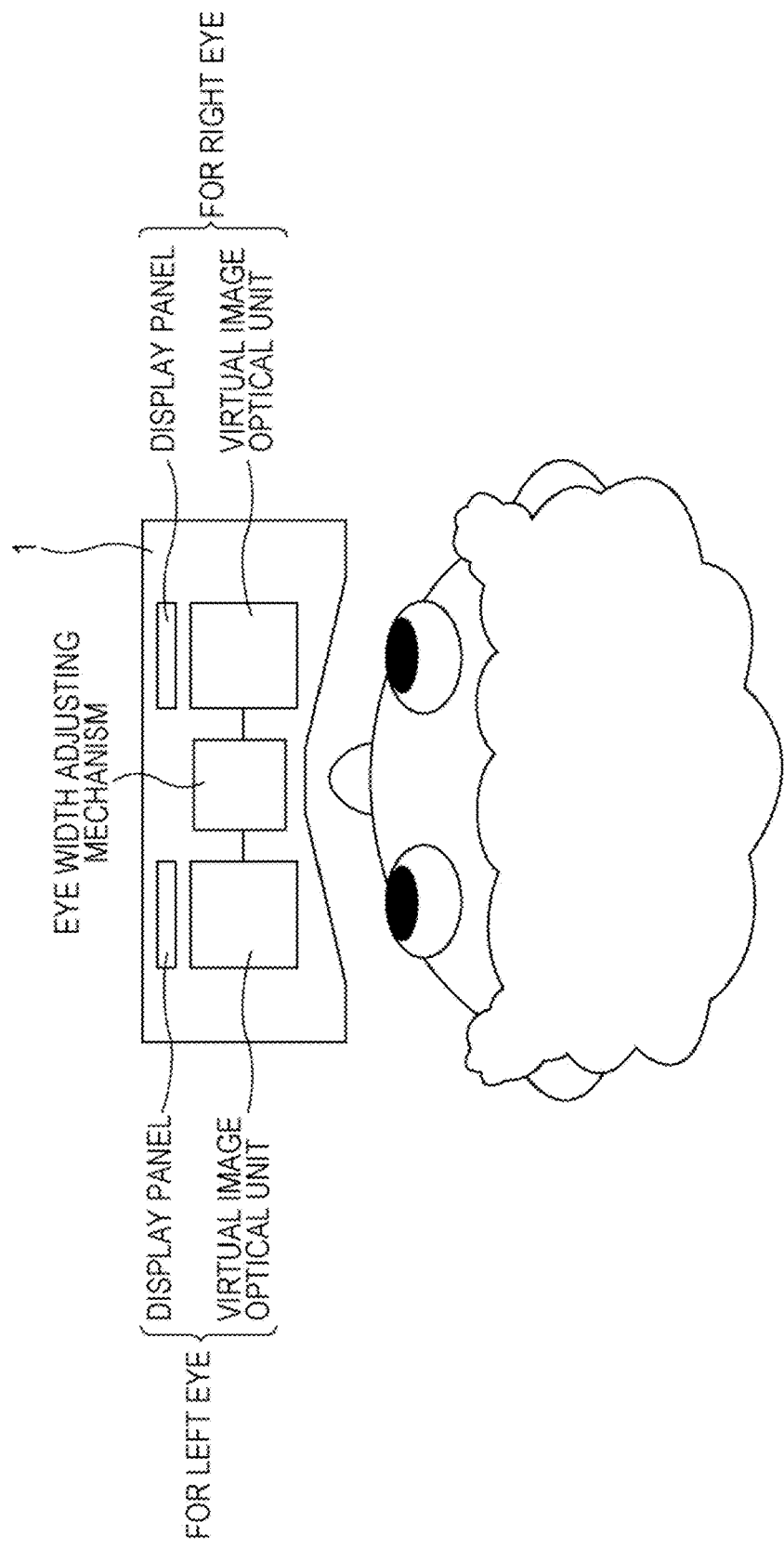
FIG. 4 is a diagram which illustrates a state in which the user wearing the image display device illustrated in FIG. 3 is viewed from the top.

FIG. 4 illustrates a state in which the user wearing the image display device 1 illustrated in FIG. 3 is viewed from the top. The illustrated image display device 1 includes display panels for a left eye and a right eye on the side surfaces facing a face of the user. The display panel is configured by a micro-display, for example, an organic EL element, a liquid crystal display, or the like. A display image of the display panel is viewed to a user as an enlarged virtual image by passing through a virtual image optical unit. In addition, since there is an individual difference in the height, or the width of eyes in each user, it is necessary to perform positioning between each display system on the left and right eyes of the user. In the example which is illustrated in FIG. 4, an eye width adjusting mechanism is provided between the right eye display panel and the left eye display panel.

Figure 5:
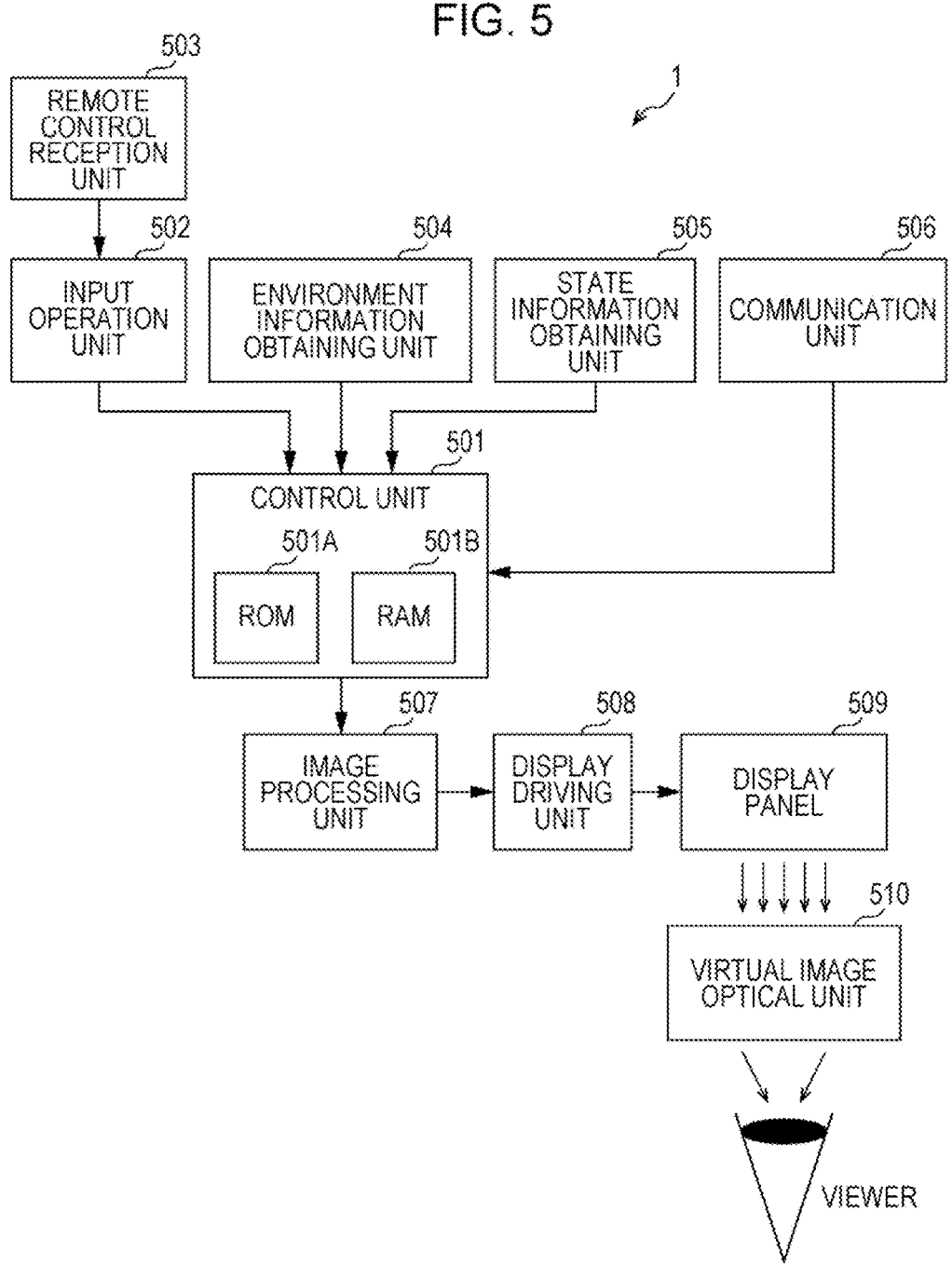
FIG. 5 is a diagram which illustrates an internal configuration example of the image display device.

FIG. 5 illustrates an internal configuration example of the image display device 1. Hereinafter, each unit will be described.

A control unit 501 includes a Read Only Memory (ROM) 501A, or a Random Access Memory (RAM) 501B. The ROM 501A stores a program code which is executed in the control unit 501, or various data items therein. The control unit 501 integrally controls the entire operation of the image display device 1 including a control of an image which is displayed on a display panel 509 by executing a program which is downloaded to the RAM 501B. As a program which is executed in the control unit 501, there are various application programs such as a translation program, a guide and information emphasizing program, an education/learning program, and the like, which are overlappingly displayed with information which is necessary for the user in the attention region to which the user is paying attention in the field of vision. However, the application program of this type will be described later in detail.

An input operation unit 502 includes one or more operators such as a key, a button, a switch, or the like, with which a user performs an input operation, receives an instruction from the user through the operator, and outputs the instruction to the control unit 501. In addition, the input operation unit 502 similarly receives an instruction from the user which is issued by a remote controller command which is received in a remote controller reception unit 503, and outputs the instruction to the control unit 501.

An environment information obtaining unit 504 obtains environment information relating to a peripheral environment excluding the image display device 1, and outputs the information to the control unit 501. The environment information obtaining unit 504 obtains, for example, an environmental optical intensity, a sound intensity, a location or a place, a temperature, weather, time, a peripheral image, or the like, as the environment information. In addition, the environment information obtaining unit 504 may include various environmental sensors (none of those is illustrated in FIG. 5) such as a light quantity sensor, a microphone, a Global Positioning System (GPS) sensor, a temperature sensor, a humidity sensor, a clock, an external camera which faces the outside, and photographs an external scenery (image in field of vision of user), and a radiation sensor. Alternatively, the image display device 1 may be configured so that the device itself does not include an environment sensor, and the environment information obtaining unit 504 obtains the environment information from an external device (not shown) including an environment sensor. The obtained environment information is temporarily stored in the RAM 501B, for example, as user information which is used when specifying an attention region in a field of vision of a user, or processing an image in the attention region, or an image in the vicinity of the attention region.

A state information obtaining unit 505 obtains state information relating to a state of a user who uses the image display device 1, and outputs the information to the control unit 501. The state information obtaining unit 505 obtains, for example, a work state of a user (whether or not user is wearing device), an action state of the user (posture of head of user wearing device, movement of line of sight, movement such as walking or the like, open/close state of eyelids), a mental state (excitement degree, awakening degree, feelings, emotion, or the like, for example, whether or not user is devoting, concentrating, or the like, to internal image while viewing), and a physical state. In addition, the state information obtaining unit 505 may include various state sensors (none of those is illustrated in FIG. 5) such as a wearing sensor which is formed by a machine switch, a GPS sensor, a gyro sensor, an acceleration sensor, a speed sensor, a pressure sensor, a body temperature sensor, a sweat sensor, a myoelectricity sensor, an electric eye sensor, an electroencephalographic sensor, an internal camera which faces the inside, that is, a face side of the user, a microphone which inputs a voice of the user. For example, the state information obtaining unit 505 can obtain a line of sight (movement of eyeball) of the user wearing the image display device 1 on the head based on output information from the myoelectricity sensor, the electric eye sensor, or the internal camera. In addition, the state information obtaining unit 505 can obtain an action plan of the user such as a destination, or the like, an item of a memorandum, or the like, based on a voice input through the microphone. The obtained state information is temporarily maintained in the RAM 501B, for example, as user information which is used when specifying an attention region in the field of vision of the user, or when processing an image in the attention region or an image in the vicinity of the attention region.

A communication unit 506 performs a communication process with another unit, a modulation and demodulation of a communication signal, and an encoding and decoding process. For example, the communication unit 506 receives an image signal for being displayed and output on the display panel 509 from an external unit (not shown) as an image source. As a matter of course, image data which is received in the communication unit 506, and is subject to demodulation and decoding, or the other received data is supplied to the control unit 501. In addition, the control unit 501 sends out transmission data which will be transmitted to the external unit from the communication unit 506.

A configuration of the communication unit 506 is arbitrary. For example, it is possible to configure the communication unit 506 according to a communication standard which is used in transmission and reception operations with the external unit as a communication partner. The communication standard may be either a wired type or a wireless type. As the communication standard which is referred to here, there are a Mobile High-definition Link (MHL), a Universal Serial Bus (USB), a High Definition Multimedia Interface (HDMI), a Bluetooth (registered trade mark) communication, an infrared communication, Wi-Fi (registered trade mark), Ethernet (registered trade mark), and the like. In addition, the image display device 1 can also use a cloud computer (not shown) by being connected to a wide area network such as the Internet through the communication unit 506.

An image processing unit 507 further performs signal processing such as an image quality correction, or the like, with respect to an image signal which is output from the control unit 501, and converts a resolution of the image signal into a resolution which fits a screen of the display panel 509. In addition, a display driving unit 508 sequentially selects pixels of the display panel 509 in each row, performs line sequential scanning, and supplies a pixel signal based on the image signal which is subject to the signal processing.

The display panel 509 is configured by a micro-display, for example, an organic EL element, a liquid crystal display, or the like. The virtual image optical unit 510 projects a display image of the display panel 509 to be enlarged, and causes a user to view the image as an enlarged virtual image.

When the image display device 1 is the transmission type, the virtual image optical unit 510 is configured by, for example, a diffractive optical element, or the like. In addition, when the image display device 1 is the light blocking type, the virtual image optical unit 510 is configured by an eyepiece optical lens.

B. Information Presenting Service to Attention Region

The image display device 1 according to the embodiment can provide an interface which presents information, for example, by overlappingly displaying information which is necessary for a user in an attention region to which the user is paying attention in the field of vision, or the like, in a form, for example, in which the control unit 501 executes a predetermined application program.

Figure 6:
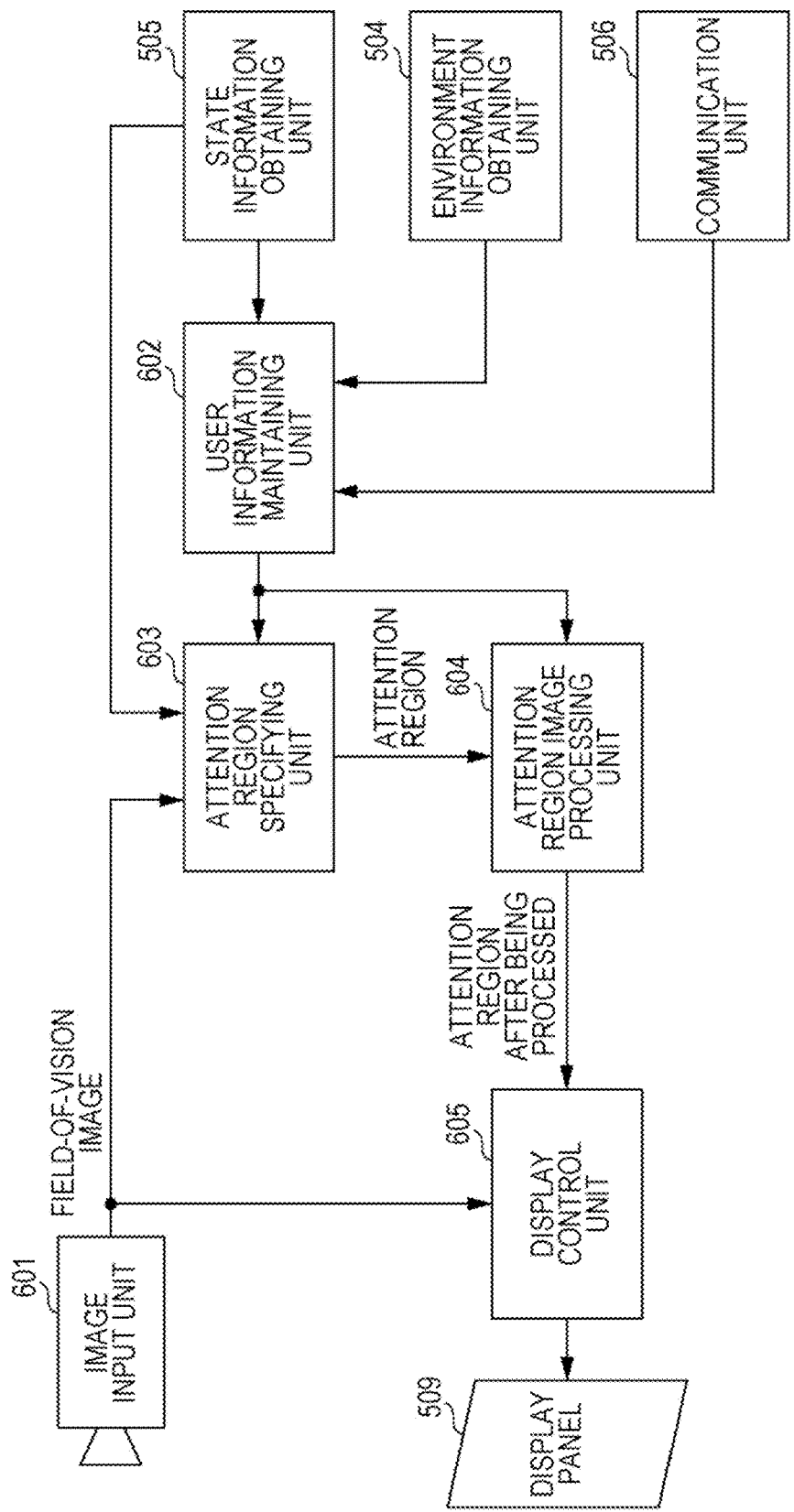
FIG. 6 is a diagram which schematically illustrates a functional configuration of the image display device which offers an information presenting service.

FIG. 6 schematically illustrates a functional configuration in which the image display device 1 offers an information presenting service.

An image input unit 601 is configured by an external camera which is included, for example, in the environment information obtaining unit 504, and inputs a peripheral image which corresponds to a field of vision of a user wearing the image display device 1.

A user information maintaining unit 602 maintains user information which is necessary for specifying an attention region from a field-of-vision image of a user, or user information which is necessary for performing image processing with respect to the specified attention region. The user information maintaining unit 602 can obtain necessary user information from, for example, environment information which is obtained by the environment information obtaining unit 504, state information which is obtained by the state information obtaining unit 505, network information which is obtained through the communication unit 506, or the like.

An attention region specifying unit 603 specifies an attention region based on user information from a field-of-vision image of a user which is input in an image input unit 601. The attention region specifying unit 603 specifies an attention region as a processing target based on user information, for example, a position of a line of sight of a user, an action history of the user, a memorandum, a work state of the user, or the like, however, details of the processing will be described later.

An attention region image processing unit 604 performs image processing with respect to the attention region which is specified by the attention region specifying unit 603. The attention region image processing unit 604 determines what processing will be performed with respect to the attention region based on user information which is maintained in the user information maintaining unit 602. As the image processing, there are, for example, substituting to another image in the attention region, highlighting of the attention region, concealment processing of the attention region, modifying processing of the attention region, and the like. The user information maintaining unit 602 obtains user information which is necessary for determining a processing method of the attention region from environment information which is obtained in the environment information obtaining unit 504, or state information which is obtained in the state information obtaining unit 505. In addition, the attention region image processing unit 604 saves data such as an image material which is used when performing image processing with respect to the attention region locally. Alternatively, the attention region image processing unit 604 may obtain the image material from a network through the communication unit 506.

A display control unit 605 controls displaying and outputting of the attention region after being subjected to the image processing onto the display panel 509. When the image display device 1 is the transmission type, the displaying and outputting onto the display panel 509 is controlled so that the attention region after the image processing is overlapped with the original attention region in the field of vision of the user thereon. In addition, when the image display device 1 is the light blocking type, an image in which the attention region after the image processing is composited on the peripheral image which is photographed using the external camera is caused to be displayed on the display panel 509 as if the image is the original peripheral image.

The image display device 1 can realize a natural interface so as to create an illusion as if the information which is necessary for the user is present in the field of vision from the start.

B-1. Translation Application

For example, when a user visits a foreign country, there is a case in which characters of the foreign language overflow everywhere, and it is difficult for the user to remember a meaning immediately. According to the technology which is disclosed in the present specification, the image display device 1 specifies, for example, a character string which is in front of a line of sight of a user, and is written in a foreign language such as English, translates the foreign language into a language which is determined based on user information such as a mother language of the user, and displays the original character string in the attention region by substituting to a translated character string.

Figure 7:
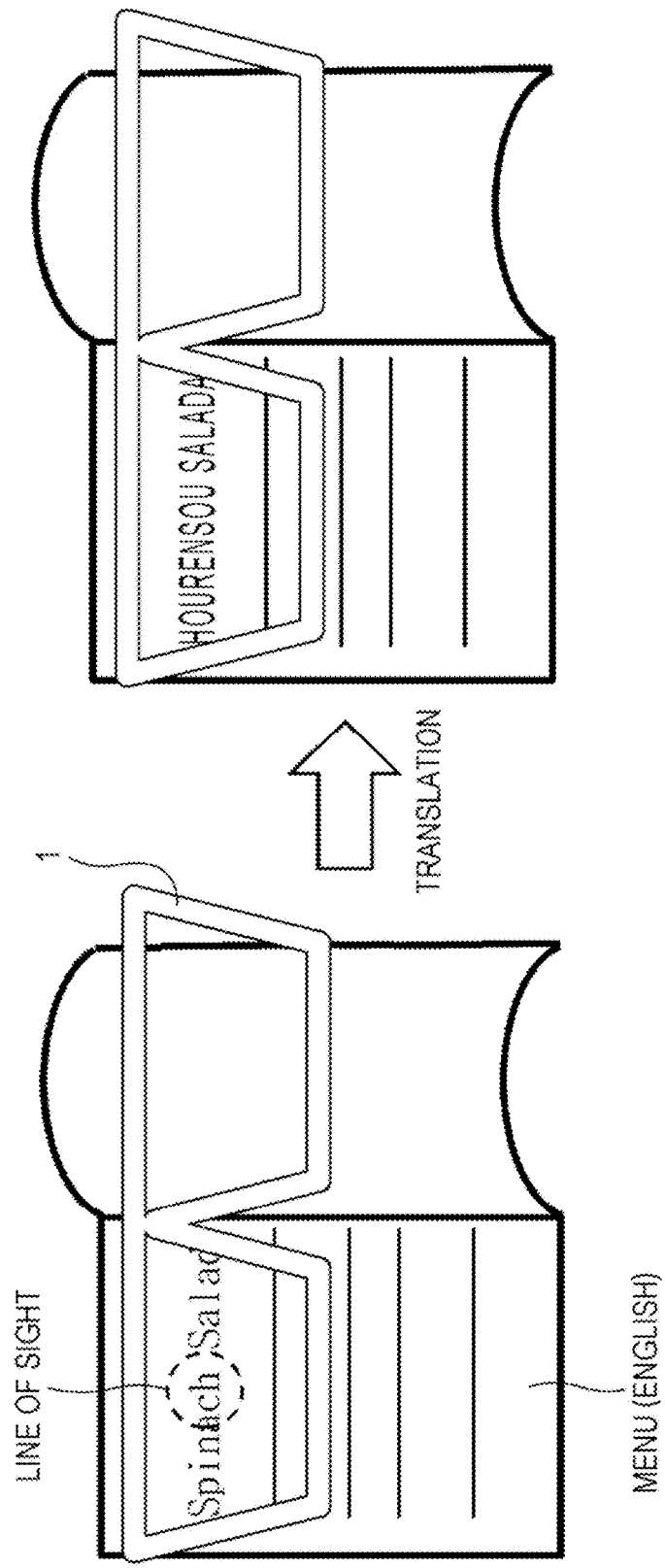
FIG. 7 is a diagram which exemplifies an image when a user wearing the transmission-type image display device is viewing a menu written in English.

FIG. 7 exemplifies an image when a user who is wearing the transmission-type image display device 1 is viewing a menu which is written in English. In the figure, the left side denotes an initial state, and the right side denotes a state in which a result of translating a character string in an attention region is displayed.

When a user views a menu written in English over the image display device 1, an English word, or an English sentence on the tip of the line of sight is specified as an attention region. On the left in FIG. 7, a region including "Spinach Salad" on the English menu is specified as an attention region based on the line of sight direction of the user. In addition, when a target language is determined to Japanese based on the user information, the image display device 1 automatically translates the English sentence "Spinach Salad" into Japanese words "HOURENSOU SALADA", and displays the Japanese words so as to overlap with the attention region "Spinach Salad" in the field of vision before translating. In this manner, it is possible to realize a natural interface so as to create an illusion as if the user views a menu written in Japanese from the start.

The attention region specifying unit 603 specifies a display region of the character string "Spinach Salad" which crosses the line of sight as the attention region, when obtaining a location of the current line of sight as the user information from the user information maintaining unit 602.

In addition, the user information maintaining unit 602 maintains user information for determining a target language. When the target language is determined to Japanese based on the user information, the attention region image processing unit 604 translates the character string "Spinach Salad" in the attention region into the Japanese words "HOURENSOU SALADA". In addition, the attention region image processing unit 604 generates a background image by painting out the character string before translating using peripheral color or texture, and attaches the translated Japanese character string "HOURENSOU SALADA" onto the background image.

In addition, the display control unit 605 displays the image which is generated in the attention region image processing unit 604 on the display panel 509 so as to overlap with the original attention region in the field of vision of the user.

The attention region image processing unit 604 generates a substitution image in the attention region by providing the substitution image with the translated character, color of the character before translating, a style of font, and an inclination on the background image on which the character string before translating is pained out. When such a substitution image is displayed so as to be overlapped with the original attention region in the field of vision of the user, it is possible to realize a natural interface so as to create an illusion as if the translated Japanese character string "HOURENSOU SALADA" is present in the field of vision from the start.

In addition, the image data of the peripheral color or texture for paining out the ground, the font data of the translated character, or the like, may be obtained from a network through the communication unit 506 without being maintained in the image display device 1. In addition, the translation processing for translating the original character may be performed using, for example, a dictionary on a cloud computer (not shown) on a network, or by receiving a translation result through the communication unit 506 by causing the cloud computer to perform the translation processing without performing in the image display device 1.

In addition, there is a case in which the number of characters is considerably different between languages even when words have the same meaning. When the number of characters remarkably increases due to translation processing, and is not fitted into the attention region with the same size as the original character, the attention region image processing unit 604 may display the translated character by reducing in font size so as to be fitted into the attention region. Alternatively, since it is difficult to view the character when being reduced in font size, the display control unit 605 may sequentially display the translated character string which is not fitted into the original attention region by scrolling the character string in the horizontal direction (or, arranging direction of character) while maintaining the font size of the translated character string. On the other hand, when the number of characters is remarkably reduced, and, with the same font size, there is a surplus region in the attention region, a font size of characters after translation may be displayed by being enlarged so as to fill the attention region.

In order to perform a natural translation without being designated by a user, the attention region image processing unit 604 may determine a target language based on a user attribute by registering the following user attributes in the user information maintaining unit 602 in advance as user information.

(1) Country from which user has come
(2) Country of residence, city of residence of user
(3) Language understood by user
(4) Proficiency level of each language of user The above described user attributes may be input through the input operation unit 502 by a user. Alternatively, the user information maintaining unit 602 may obtain the user attribute from a cloud computer through the communication unit 506 by maintaining the user attribute which is input to another unit belonging to the user, or is input in a website in the cloud computer on the network. The user information maintaining unit 602 can automatically set a country of residence or a city of residence of the user from action history information which is obtained by the state information obtaining unit 505 based on output information of a GPS sensor. In addition, a language which is understood by the user, or a proficiency level of each language may be automatically set by the state information obtaining unit 505 based on a voice recognition result of a conversation of the user which is input from a microphone.

In addition, it is possible to automatically set a language which is understood by the user according to a country from which the user has come, a country of residence, and a residence area. When a residence area and a language which is understood by the user do not match each other, for example, in a case of right after overseas posting, an understandable language is set based on the user input.

When there are a plurality of languages which are understood by the user, it is possible to set a language proficiency level in each language. The proficiency level which is referred to here is set in a plurality of stages such as a native level, an everyday conversation level, a beginner level, or the like.

When current location information of the user is obtained based on output information of the GPS sensor, or the like, it is possible to determine whether or not the user went to another place other than the country of residence by comparing the current location with the above described user attribute. In addition, the image display device 1 enters a translation mode automatically, and starts an information presenting service as illustrated in FIG. 7 when the current location is determined to be another country, not the county of residence. For example, an official language of the current location is set to a source language, and a language of which a proficiency level is the highest for the user (usually native language) is set to the target language. However, when the source language is an understandable language for the user, and a proficiency level thereof is sufficiently high, the translation mode may be omitted.

When the image display device 1 is caused to automatically transfer to the translation mode in this manner, it is not necessary for the user to explicitly perform switching of a language, and when the user looks at a word which is not understandable, the word is automatically switched to an understandable language, and is presented by being overlapped with a field-of-vision image of the user. Accordingly, when the user wears the image display device 1 on the head, it is possible to use a translation function in an extremely natural interface.

Figure 8:
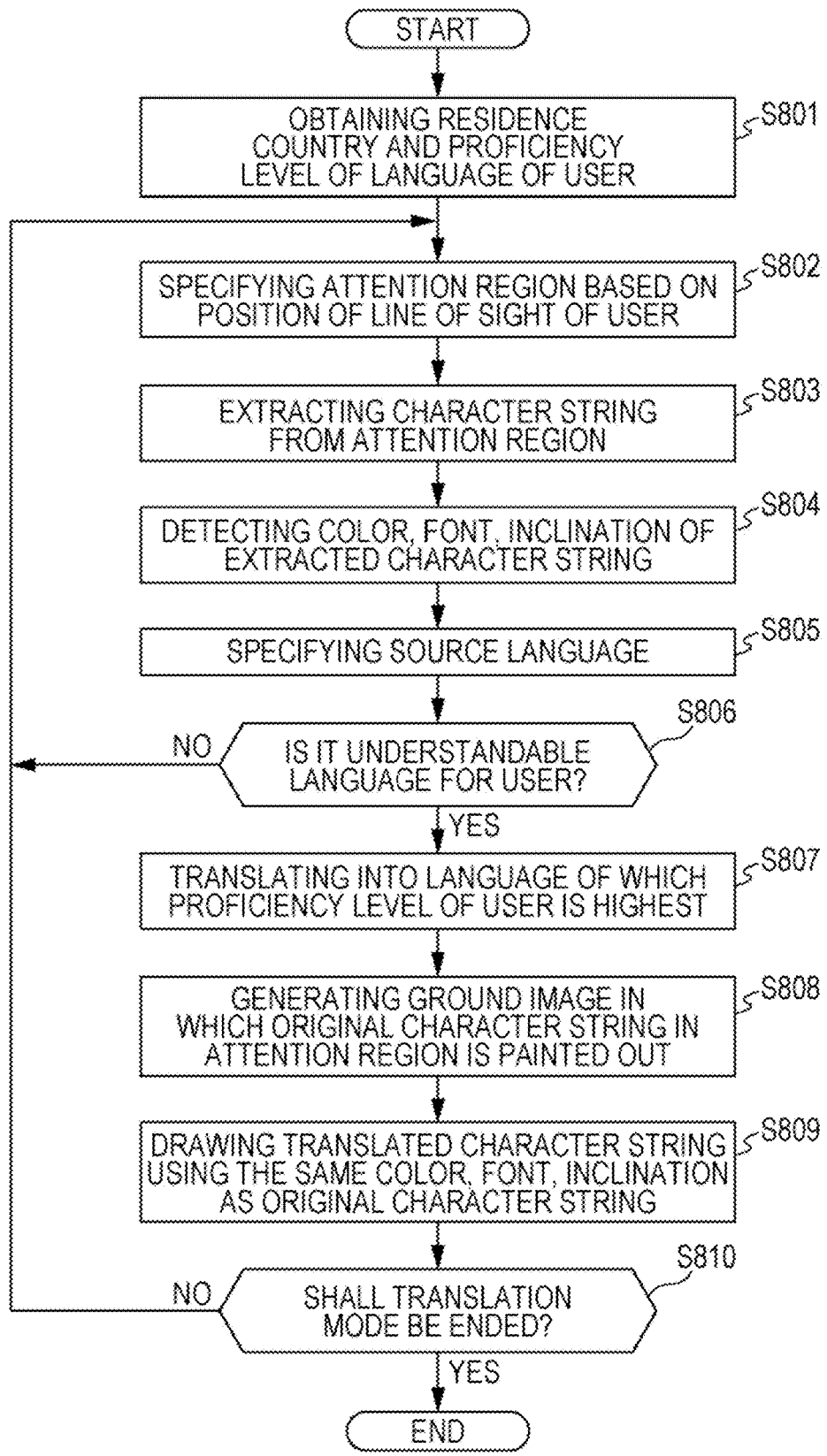
FIG. 8 is a flowchart which illustrates a processing procedure for providing the above described translation service by the image display device.

FIG. 8 illustrates a processing procedure for providing the above described translation service by the image display device 1 using a flowchart. It is possible to execute the processing procedure in a form, for example, that the control unit 501 executes a translation application program. The processing procedure starts, for example, when the current location is determined to be another country, not the country of residence.

First, user information such as a country of residence, a proficiency level of a language, or the like, of a user wearing the image display device 1 is obtained from the user information maintaining unit 602 (step S801).

In addition, a field-of-vision image of a user is obtained using an external camera, or the like, which is included in the environment information obtaining unit 504, and a position of a line of sight of the user is detected based on output information of a myoelectricity sensor, an electric eye sensor, or the internal camera in the state information obtaining unit 505. In addition, the attention region specifying unit 603 specifies an attention region as a target of a drawing process from a field-of-vision image of the user based on the detected position of the line of sight of the user (step S802). In addition, the attention region specifying unit 603 may specify an attention region based on user information excluding the position of the line of sight of the user.

When a character string is extracted from the specified attention region (step S803), the attention region image processing unit 604 detects color of the extracted character string, a style of a font, an inclination (step S804), and maintains the information.

Subsequently, the attention region image processing unit 604 searches the character string which is extracted from the attention region in a dictionary, and specifies a source language (step S805).

In addition, the attention region image processing unit 604 determines a target language based on the user attribute which is registered in the user information maintaining unit 602 in advance. Specifically, the attention region image processing unit checks whether or not the source language is a language which is understandable for the user (step S806).

When the target language is a language which is understandable for the user (No, in step S806), the process returns to step S802 since it is not necessary to perform translation processing with respect to a current attention region. In addition, the process enters a wait state until a position of a line of sight of the user is moved, and the subsequent attention region is specified.

On the other hand, when the source language is not an understandable language by the user (Yes, in step S806), the attention region image processing unit 604 sets a language of which a proficiency level of the user is the highest (usually native language) as the target language, and performs translation of the character string (step S807)

Subsequently, the attention region image processing unit 604 generates a background image by painting out the character string before translating in the attention region using a peripheral color and texture (step S808).

In addition, when the character string which is configured by the original language is translated into the target language which is set in step S807, the attention region image processing unit 604 draws the target language on the background image generated in step S808 using the same color of the character string, the same style of font, the same inclination as those in the original character string (step S809). The display control unit 605 displays the image which is generated in the attention region image processing unit 604 on the display panel 509 so as to be overlapped with the original attention region in the field of vision of the user.

Thereafter, the image display device 1 checks whether or not the translation mode is ended (step S810). For example, when the current location is changed to the country of residence, the translation mode is automatically ended (Yes, in step S810). Alternatively, the translation mode is ended according to an instructing operation of ending the translation mode which is performed with respect to the input operation unit 502 by the user. In addition, when the translation mode is not ended (No, in step S810), the process returns to step S802, and enters a wait state until the position of line of sight of the user moves, and the subsequent attention region is specified.

B-2. Information Emphasizing Application

In a real life, a user views a field of vision by paying attention thereto in his own way, however, there is a case in which the user miss a desired thing, and it is difficult to find out the thing well. According to the technology which is disclosed in the specification, the image display device 1 can specify important information which is included in the field of vision based on a current action plan, an action history up to the point, life habits, and various pieces of user information, in addition to those, of the user as an attention region, display the information by emphasizing so that a background, and things except for the background are classified, and make the user reliably obtain the important information.

B-2-1. Application to Navigation

For example, when a user visits an unknown place, it is possible to check a route to a destination in advance using a map, or software which presents a transit guide. However, it is difficult for the user to smoothly act in a place which is the first visit for the user, as if the place is the same as that of an area he usually lives. It is complicated, and difficult to transfer when going to a transfer station in practice, and it is usual to recheck the transfer on the spot. There also is a case in which a user wastes time and a fare by taking the next train, or a wrong train.

In contrast to this, according to the technology which is disclosed in the specification, the image display device 1 can perform highlighting such as surrounding with a red frame, changing color or size of characters, or the like, with respect to information which is necessary for a user in a field of vision of the user, and make the information attract attention.

Figure 9A:
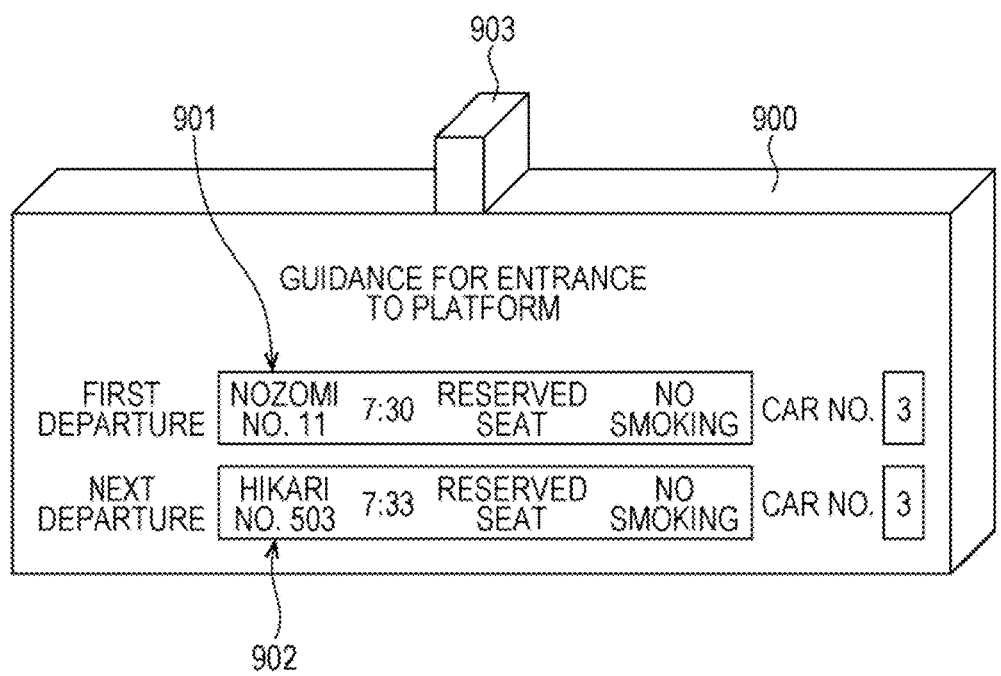
FIG. 9A is a diagram which exemplifies an image when the user wearing the transmission-type image display device is viewing a guide board in a platform of a railroad station.
Figure 9B:
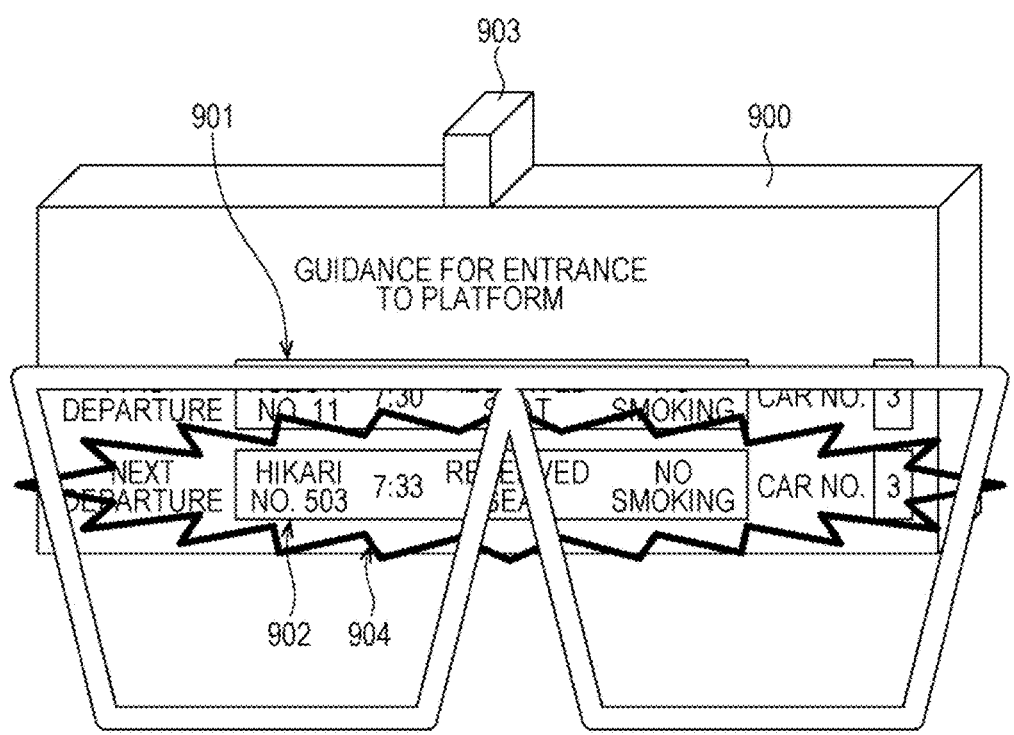
FIG. 9B is a diagram which exemplifies an image when the user wearing the transmission-type image display device is viewing the guide board in the platform of the railroad station.
Figure 9C:
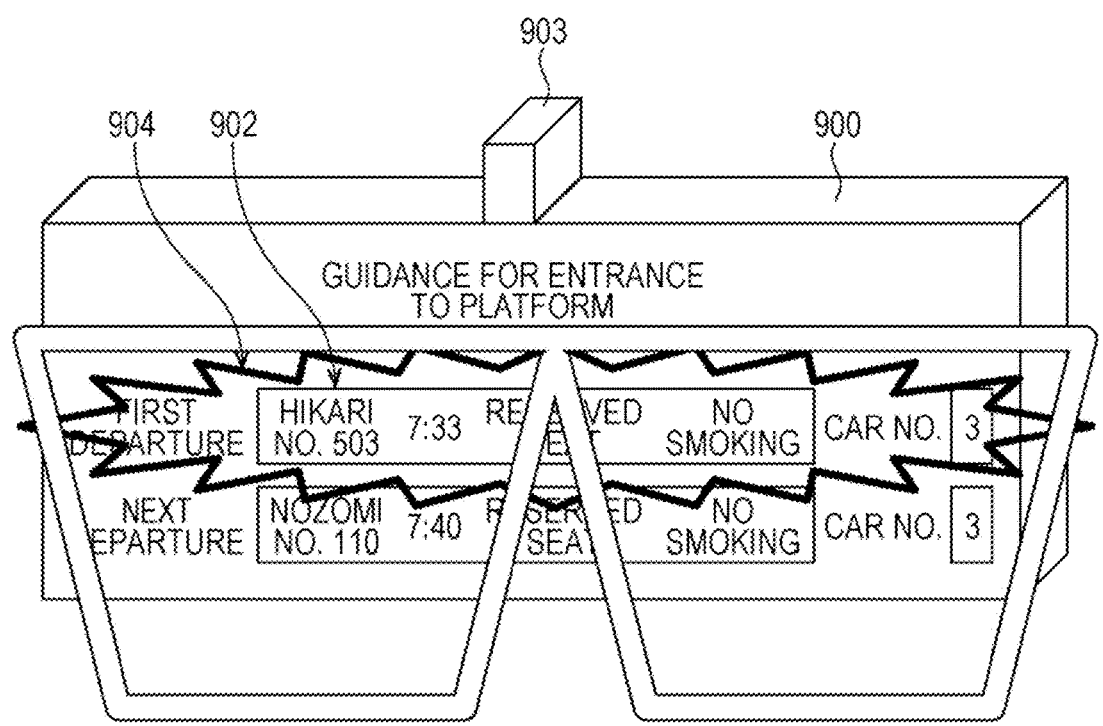
FIG. 9C is a diagram which exemplifies an image when the user wearing the transmission-type image display device is viewing the guide board in the platform of the railroad station.

FIGS. 9A to 9C illustrate images when a user wearing a transmission-type image display device 1 views a guide board in a platform of a railroad station.

A guide board 900 displays information on a plurality of trains which departs from the station including, for example, information 901 on a starting train (train of which starting is closest to current time), and information 902 on the next train in multiple stages. In each stage, a name of a train, a departure time of the train, a classification of vehicle such as a "reserved seat", or an "unreserved seat", smoking information, a vehicle number, and the like, are displayed. Usually, the guide board is suspended by a support body 903 from a ceiling of the platform (refer to FIG. 9A).

In the image display device 1, the user information maintaining unit 602 maintains important user information such as an action history, a schedule, a memorandum (reminder), a current action target (arriving when and where, or the like) of a user. When estimating that a train the user should take is Hikari No. 503 by using such user information, and checking a current time, or a current location, the attention region specifying unit 603 specifies a stage 902 in the guide board 900 which is in the field of vision of the user, and displays corresponding train information as an attention region. In addition, when the attention region image processing unit 604 generates an image for highlighting the attention region 902 by surrounding with a frame 904, the display control unit 605 displays the image which is generated in the attention region image processing unit 604 on the display panel 509 so as to be exactly overlapped with the corresponding stage 902 in the guide board 900 in the see through image which is viewed by the user (refer to FIG. 9B). Pieces of train information 901 and 902 of a plurality of stages are displayed on the guide board 900, however, since the stage 902 which is surrounded with the frame 904 attracts attention, it is possible for the user to take a vehicle he should take without overlooking the vehicle.

The guide board 900 is an inversion flap type, or an electric notice-board, and in which, when the time passes, and the starting train departs, the information display 902 of the next train moves up to the upper stage. Thereafter, the image display device 1 moves a place which is highlighted by being surrounded with the frame 904 in a see-through image which is viewed by the user according to the change in the display (refer to FIG. 9C).

Figure 10A:
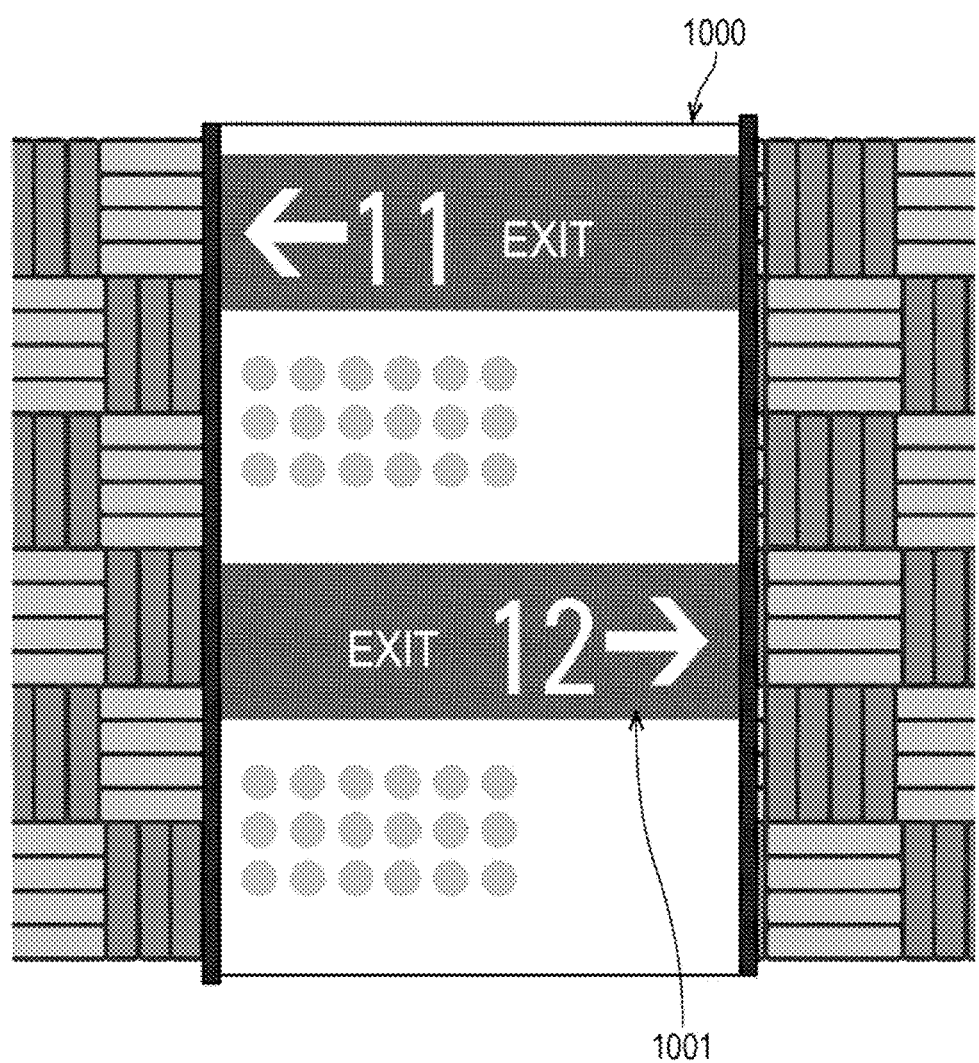
FIG. 10A is a diagram which exemplifies an image when a user wearing the transmission-type image display device is viewing an exit guidance.
Figure 10C:
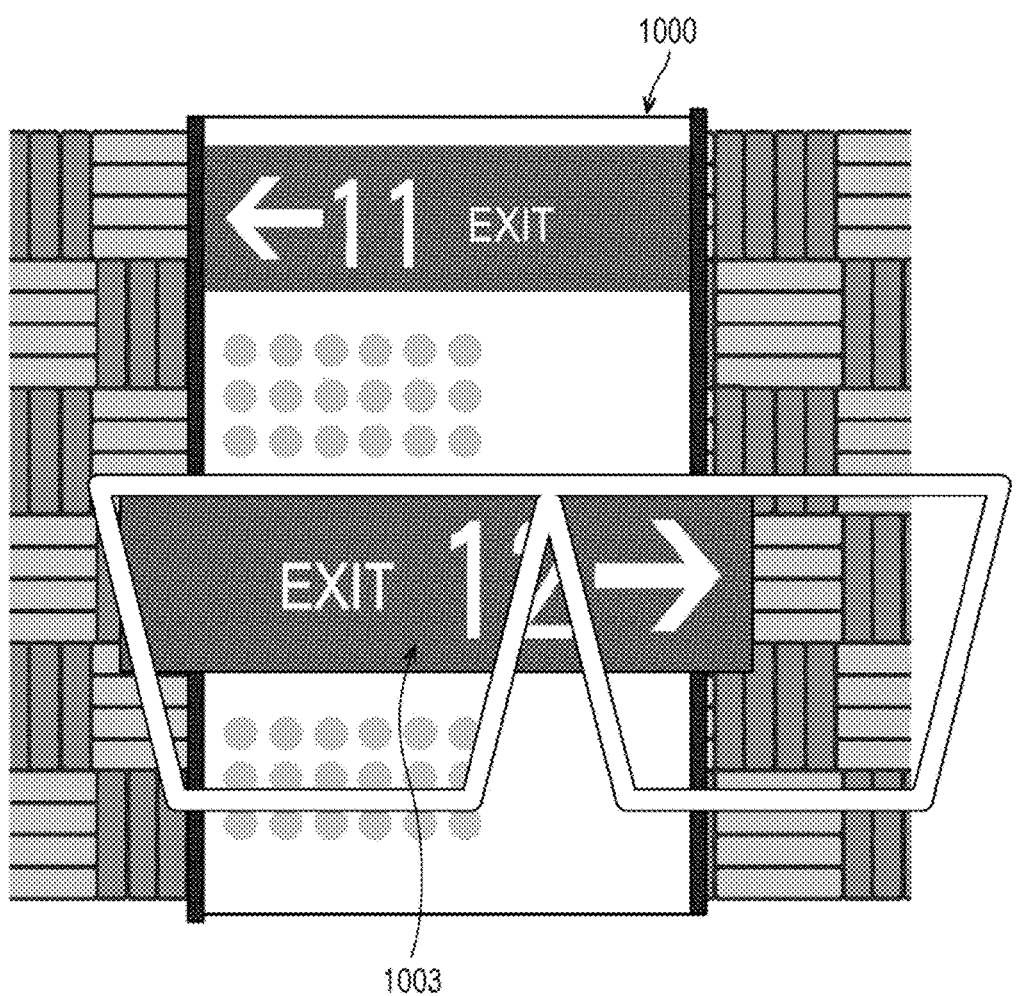
FIG. 10C is a diagram which exemplifies an image when the user wearing the transmission-type image display device is viewing the exit guidance.

FIGS. 10A to 10C exemplify images when a user wearing the transmission-type image display device 1 views an exit guidance 1000 in the inside of a subway station, or the like. Usually, there are a plurality of exits in the inside of a station, and a plurality of exit guidance is provided, as well.

In the image display device 1, the user information maintaining unit 602 maintains the important user information such as an action history, a schedule, a memorandum (reminder), a current action target (arriving when and where, or the like), or the like, of the user. The attention region specifying unit 603 uses such user information, and estimates an optimal exit, or a transfer route by checking a current time, or a current location, and when an exit guidance indication 1001 corresponding to the field of vision of the user comes in, the exit guidance indication is specified as an attention region (refer to FIG. 10A). In addition, the attention region image processing unit 604 generates an image which will be highlighted by surrounding an attention region 1001 with a frame 1002 (refer to FIG. 10B). Alternatively, the attention region image processing unit 604 generates an image 1003 for displaying an attention region, that is, exit guidance by enlarging thereof. The display control unit 605 displays the image 1003 which is generated in the attention region image processing unit 604 on the display panel 509 so as to be exactly overlapped with the corresponding exit guidance indication 1001 in a see-through image which is viewed by the user (refer to FIG. 10C). Since exit guidance 1002, or 1003 which is surrounded with a frame, or is displayed by being enlarged attract attention, it is possible for the user to go out through an exit which is closer to a destination without overlooking the exit.

In addition, as methods of highlighting an attention region, there are various methods such as causing the attention region to attract attention by using color which is different from the periphery, in addition to the method of surrounding the attention region with a frame (refer to FIG. 10B), and the method of displaying the attention region by enlarging thereof (refer to FIG. 10C).

In addition, it is possible to determine whether or not the user is familiar with a place by comparing the city of residence in the user information with a current location, and by checking whether or not the user has visited the place many times, even if the place is not the city of residence, from the action history. For example, when the user visits the place a couple of times a year, the user does not get lost compared to a place the user is new there, that is, the guidance indication may be not necessary. Similarly to the proficiency level of a language, by setting a perception degree in a place in the current location of the user, and controlling amount of information which will be highlighted according to the perception degree in the place, it is possible to suppress redundant highlighting in a familiar place, and to perform more natural and pleasant information presenting.

Usually, since a guide board in a station, or a road displays information for everyone, and includes lots of pieces of information which are not necessary for the user, it is difficult for the user to find out necessary information by being buried in information which seems to be necessary. According to the technology which is disclosed in the specification, since the image display device 1 specifies an attention region based on user information for each user who is wearing the device 1, and highlights, it is possible for the user to keep an eye only on information which is necessary for him among the guidance indications for everyone. That is, it is possible to provide a guidance indication corresponding to a user, individually, and to smoothly guide each user to a different destination.

B-2-2. Application to Memorandum

A user is apt to forget an errand, for example, buying milk, posting a letter, or the like, in the middle of commutating or attending school. Even when writing a memorandum for it, the user forgets to see the memorandum. As old habits, things which are easy to forget are directly written on a palm, however, there is a case in which letters are blurred by sweat, and are not readable, or the user comes home without seeing the letters since he is carrying a bag with hands.

In contrast to this, according to the technology which is disclosed in the specification, the image display device 1 highlights a thing which is forgotten in a field of vision of the user based on contents which are registered in a reminder, and causes the user to remember the errand.

Figure 11A:
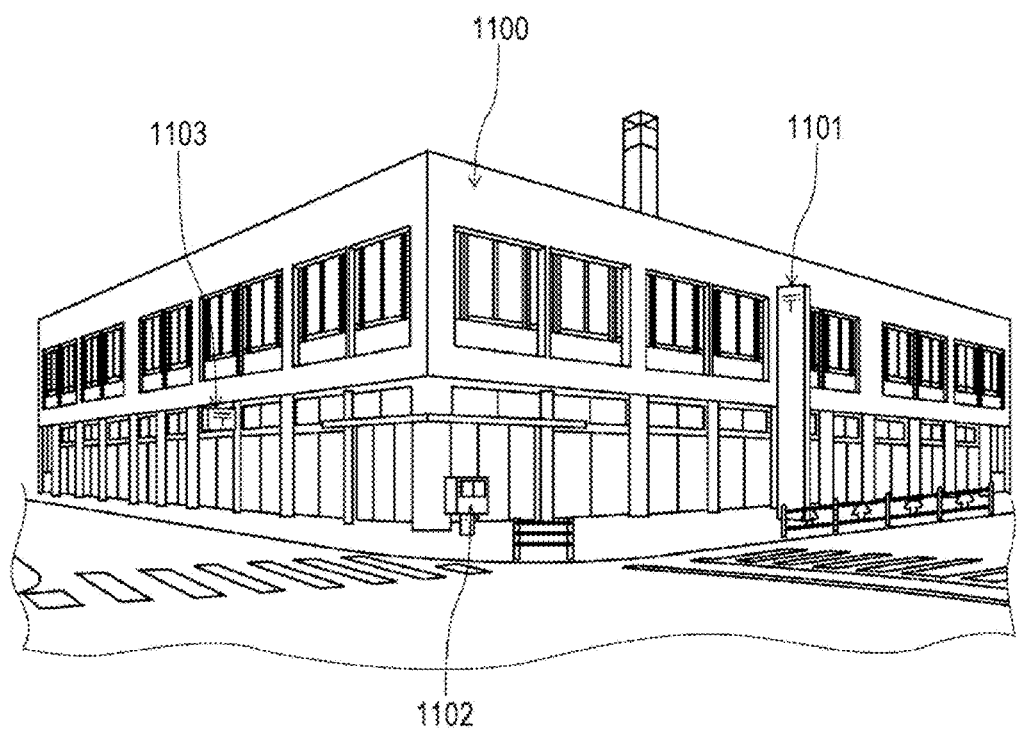
FIG. 11A is a diagram which exemplifies a scenery of a school road or a commuting road.
Figure 11B:
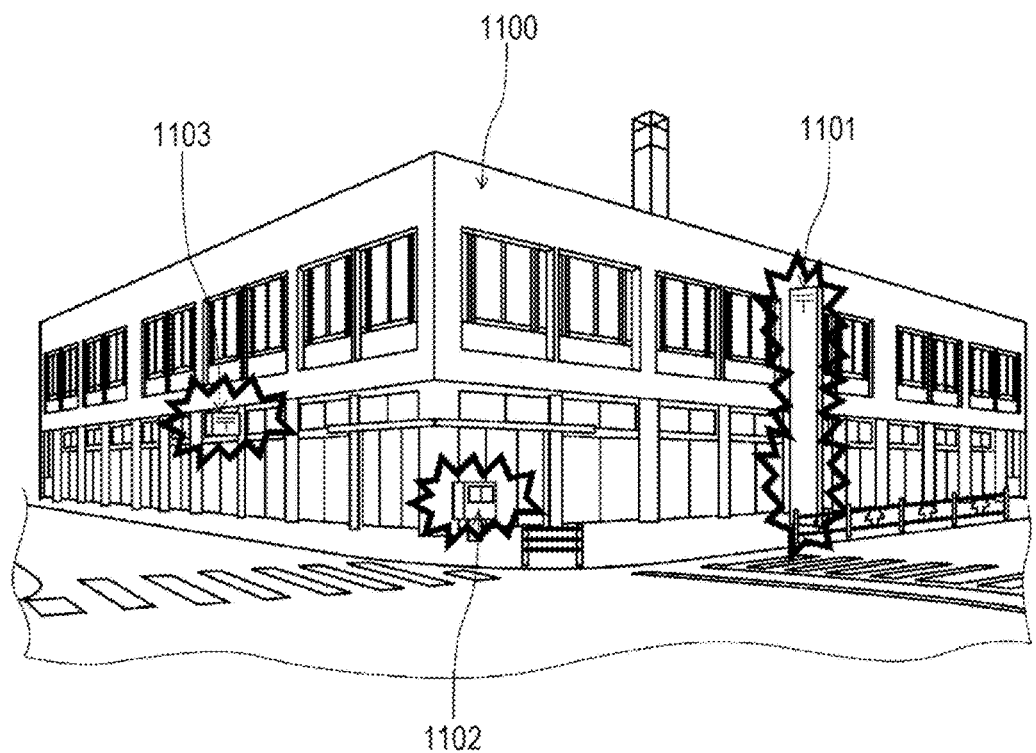
FIG. 11B is a diagram which illustrates an image when a user wearing the transmission-type head-mounted image display device is viewing the scenery which is illustrated in FIG. 11A.

FIGS. 11A and 11B exemplify images when a user wearing the transmission-type image display device 1 views a school road or a commuting road. In the illustrated example, a situation is assumed that a user who is asked for posting mail approaches a post office 1100 on the street corner.

In the image display device 1, the user information maintaining unit 602 maintains a memorandum of the user as user information. The attention region specifying unit 603 analyzes a field-of-vision image, and when information relating to a matter which is registered in the memorandum comes in, the attention region specifying unit specifies the information as an attention region. In the example which is illustrated in FIG. 11A, a signboard 1101, a postbox 1102, and a postal symbol 1103 of the post office 1100 which are present in the field of vision are specified as attention regions. In addition, when the attention region image processing unit 604 generates images for highlighting by surrounding the attention regions 1101, 1102, and 1103 with frames, the display control unit 605 displays the images which are generated in the attention region image processing unit 604 on the display panel 509 so as to exactly overlap with the signboard 1101, the postbox 1102, and the postal symbol 1103 of the post office 1100, respectively, in a see-through image which is viewed by the user (refer to FIG. 11B). The user has more opportunities of remembering the fact that he is asked for posting of a mail when viewing an image in which the signboard 1101, the postbox 1102, and the postal symbol 1103 of the post office are highlighted. Since there is a high possibility that a store, or a facility for achieving the purpose such as errands is present near the current place, the user is able to take an action such as posting of a mail.

In addition, the image display device 1 can highlight information which may be useful for a user (product which is recommended to buy in store) by handling a keyword, a mark, or the like, to which the user currently desires to pay attention, not the memorandum, as user information.

Figure 12:
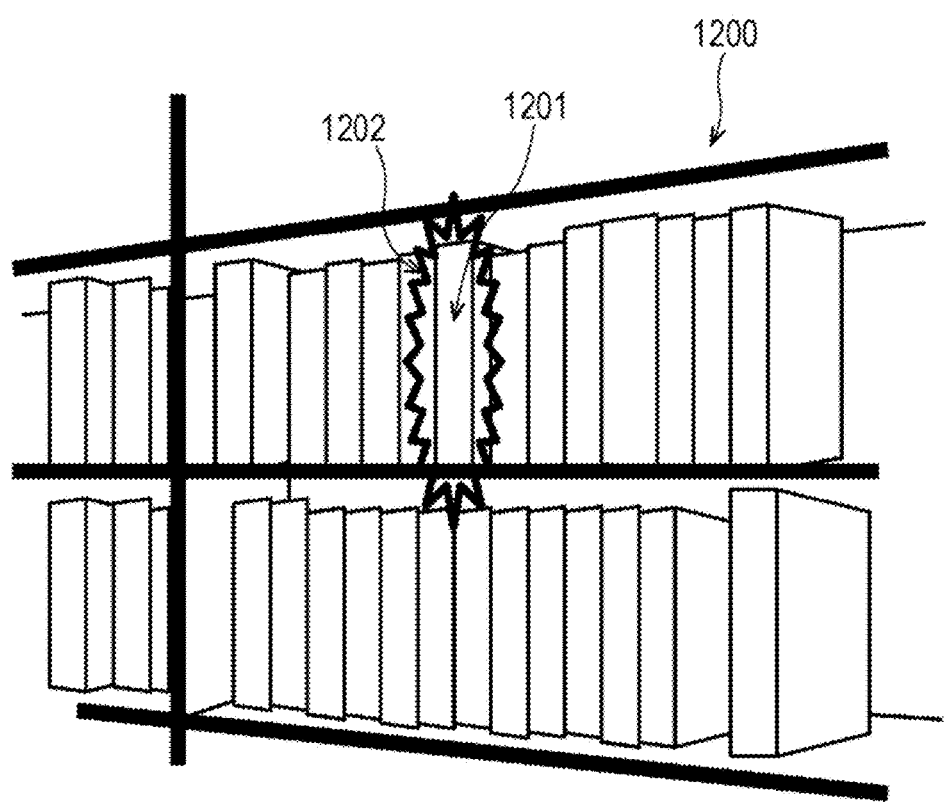
FIG. 12 is a diagram which exemplifies an image when a user wearing the transmission-type image display device views a showcase of a bookstore.

FIG. 12 exemplifies an image when a user wearing the transmission-type image display device 1 views a bookshelf 1200 in a bookstore.

In the image display device 1, the user information maintaining unit 602 maintains a keyword, a mark, or the like, to which the user currently desires to pay attention as user information. The attention region specifying unit 603 analyzes a field-of-vision image (bookshelf in bookstore), and when a spine 1201 of a title which hits a keyword, or the like, enters, the attention region specifying unit specifies the spine as an attention region. In addition, when the attention region image processing unit 604 generates an image for highlighting by surrounding the attention region with a frame 1202, the display control unit 605 displays the image which is generated in the attention region image processing unit 604 on the display panel 509 so as to exactly overlap with the spine 1201 of the book which hits the keyword search, or the like, in a see-through image which is viewed by the user. When viewing an image in which a spine of a specified book is highlighted, the user is tempted to pick up the book, and is motivated to buy the book so as to read the book.

In addition, in search processing of a book based on a keyword, or the like, to which a user currently desires to pay attention, the image display device 1 may request a keyword search through the communication unit 506, and may entrust the search processing to a cloud computer which includes enormous book databases. In addition, a reading history of a user is also used as user information, and searching is performed by excluding a book which is read by the user in advance, even when the book hits the keyword.

FIG. 13 illustrates a processing procedure which is performed by the image display device 1 in order to provide the above described guidance indication, or an information highlighting service in a form of a flowchart. It is possible to execute the processing procedure in a form that, for example, the control unit 501 executes the guidance indication, and an information highlighting application program when the image display device 1 transits to the information highlighting mode. The processing procedure of the guidance indication is started, for example, when it is determined that the user is not familiar with a current location.

First, user information such as a current schedule, an action target, a memorandum, and the like, of a user who is wearing the image display device 1 is obtained from the user information maintaining unit 602 (step S1301).

Subsequently, important information for the user is determined among the current schedule, the action target, the memorandum, and the like, of the user which are obtained from the user information maintaining unit 602 (step S1302). Details of determination processing of the important information will be described later.

Subsequently, a field-of-vision image of the user is obtained using an external camera, or the like, which is included in the environment information obtaining unit 504 (step S1303). In addition, the important information which is specified in step S1302 is searched from the field-of-vision image of the user (step S1304).

When the important information is not found from the field-of-vision image of the user (No, in step S1305), the specifying processing of the important information of the user (step S1302), the obtaining of the field-of-vision image of the user (step S1303), and the search processing of the important information from the field-of-vision image (step S1304) are repeatedly executed. It is assumed that the user moves, and a field-of-vision image is changed while the search processing of the important information is repeated.

On the other hand, when the important information is found from the field-of-vision image of the user (Yes, in step S1305), the attention region specifying unit 603 specifies an attention region as a target of a drawing process according to a type of the found important information (step S1306).

In addition, the attention region image processing unit 604 performs image processing such as an arrow, a closing line, color highlighting, or the like, that is, drawing according to a type of the found important information with respect to the attention region (step S1307). The display control unit 605 displays the image which is generated in the attention region image processing unit 604 on the display panel 509 so as to be overlapped with the original attention region in the field of vision of the user.

The above described drawing process in the attention region is repeatedly executed until the information highlighting mode is ended in the image display device 1 (step S1308).

Figure 14A:
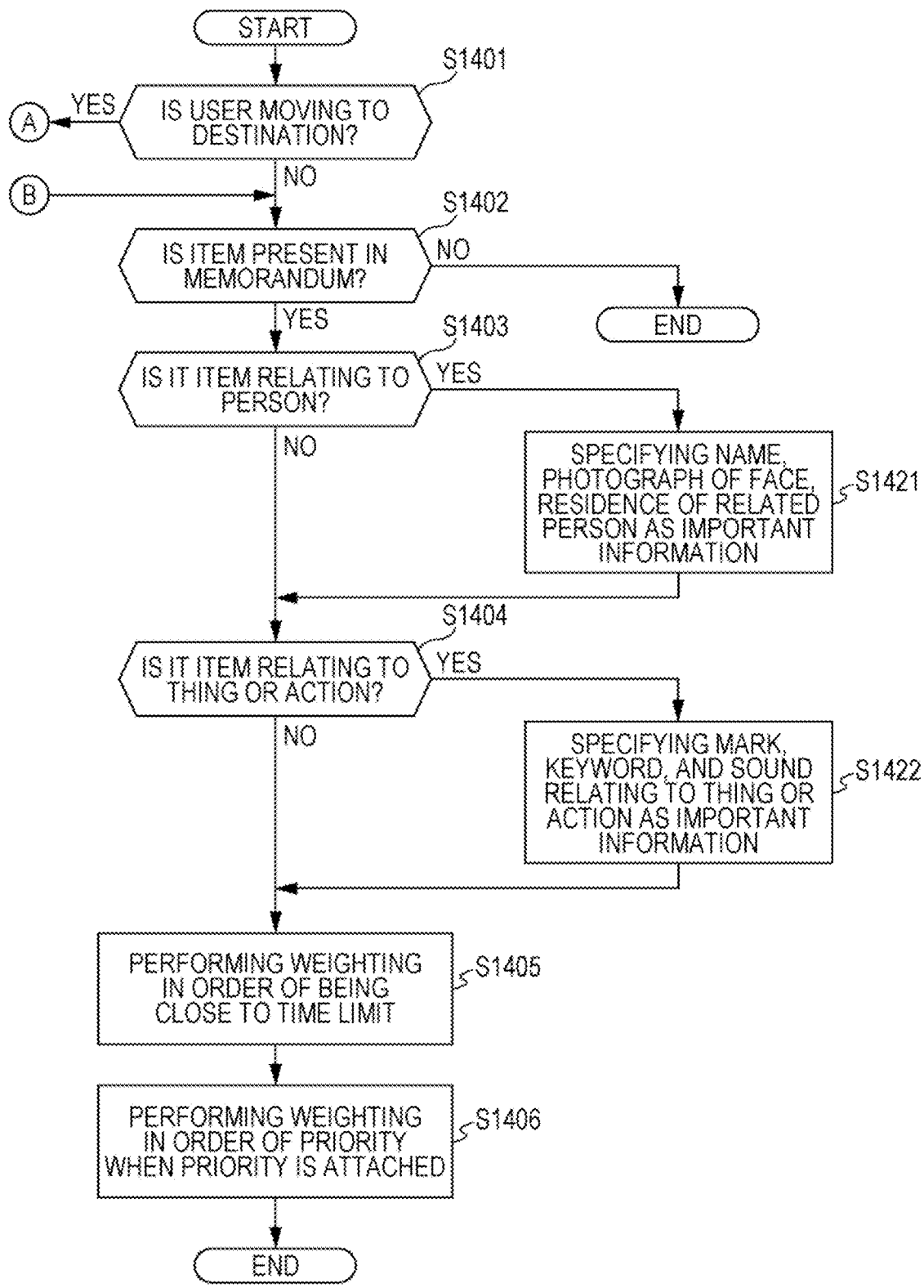
FIG. 14A is a flowchart which illustrates a detailed processing procedure of an important information determining process.
Figure 14B:
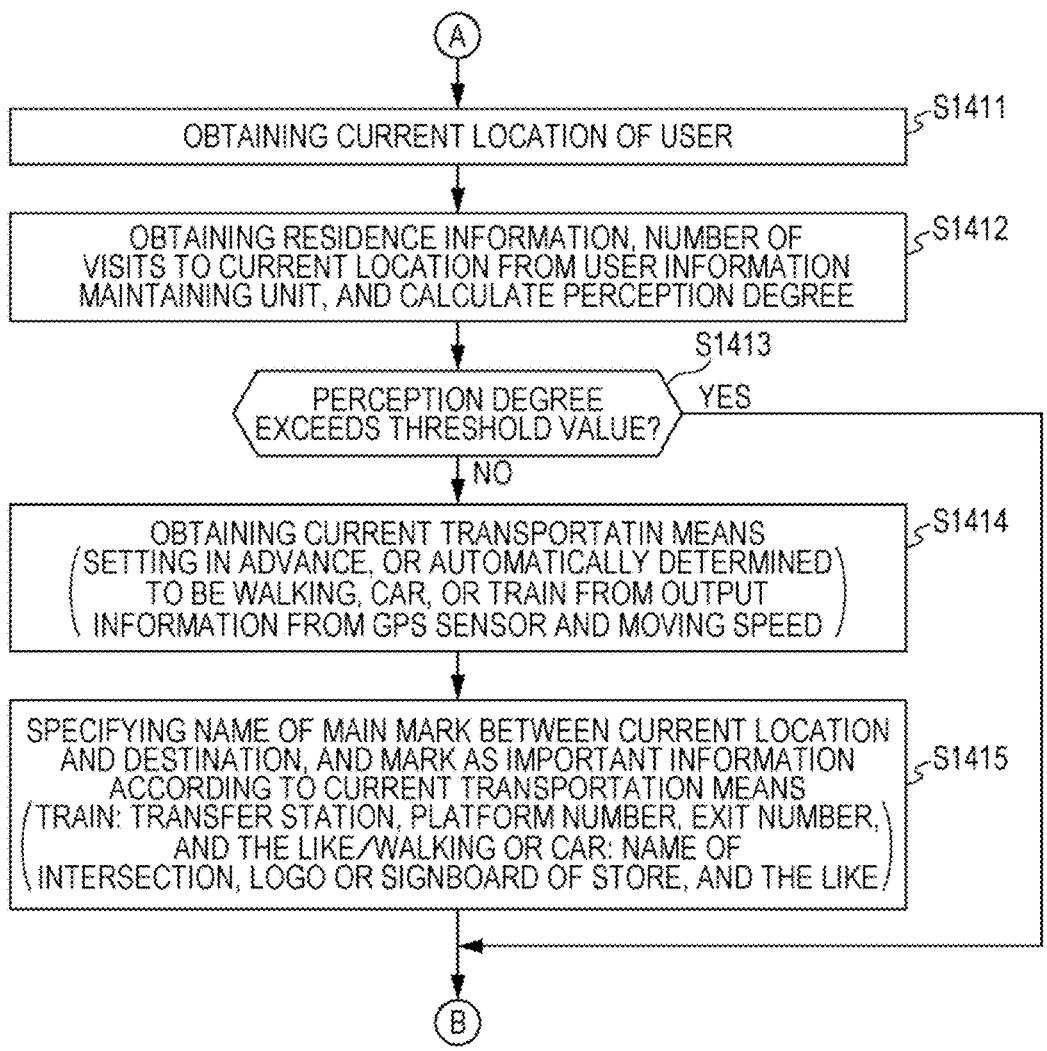
FIG. 14B is a flowchart which illustrates a detailed processing procedure of the important information determining process.

FIGS. 14A and 14B illustrate a detailed processing procedure of the important information determination processing which is executed in step S1302 in the flowchart in FIG. 13 in a form of a flowchart. The important information determination processing is processing which is performed by the attention region specifying unit 603 based on the user information, or the state information.

First, the attention region specifying unit 603 determines whether or not the user, that is, the image display device 1 is moving to a destination based on output information from a GPS sensor, or an acceleration sensor which is included in the state information obtaining unit 505 (step S1401).

Here, when the user is moving to the destination (Yes, in step S1401), the attention region specifying unit 603 obtains a current location of the user based on the output information from the GPS sensor which is included in the state information obtaining unit 505 (step S1411). In addition, the attention region specifying unit 603 obtains residence information on the current location of the user, and the number of visits from the user information maintaining unit 602, calculates a perception degree in a place with respect to the current location of the user (step S1412), and checks whether or not the perception degree in the place exceeds a predetermined threshold value (step S1413).

When the perception degree in the place with respect to the current location of the user is lower than the predetermined threshold value, and it is necessary to guide the current location (No, in step S1413), the attention region specifying unit 603 specifies a current transportation means of the user (step S1414). The current transportation means is set in the user information maintaining unit 602 by the user in advance, or is automatically determined to be any one of walking, a car, and a train, from position information which is obtained from the GPS sensor, and a moving speed which is obtained from a speed sensor, or the like.

In addition, the attention region specifying unit 603 determines a name of a main mark, and a mark between the current location and the destination as important information according to the transportation means (step S1415). For example, when the current transportation means is a train, a transfer station, a home number, an exit number, and the like, are specified as the important information. In addition, when the current transportation means is walking, or a car, the name of an intersection, a logo or a signboard of a store, and the like, are specified as the important information.

In addition, when the user is not moving to the destination (No, in step S1401), the user is familiar with the current location, and it is not necessary to guide the user (Yes, in step S1413), and the important information on the user who is moving to the destination is finished being determined (step S1415), the attention region specifying unit 603 subsequently checks whether or not the item is in the memorandum (step S1402). When the item is not present in the memorandum (No, in step S1402), the processing routine is ended.

When there is the item in the memorandum (Yes, in step S1402), the attention region specifying unit 603 checks whether or not the item relates to a person (step S1403). In addition, when the item in the memorandum relates to the person (Yes, in step S1403), the attention region specifying unit 603 specifies a name, a photograph of face of the person, a place where the person lives as important information (step S1421).

Subsequently, the attention region specifying unit 603 checks whether the item is an item in the memorandum, or is an item relating to a thing or an action (step S1404). In addition, when the item in the memorandum relates to a thing or a person (Yes, in step S1404), the attention region specifying unit 603 specifies a mark, a keyword, and a sound relating to the thing and the action as important information (step S1422).

When the important information is determined based on the destination, or the memorandum of the user in this manner, the attention region specifying unit 603 performs weighting of each important information in order which is close to a time limit (step S1405). In addition, when there is important information which is attached with a priority, weighting of each important information is performed in priority order (step S1406).

B-3. Education/Learning Application

A workbook 1500 which is attached with answers in which a colored cellophane sheet 1503 is used, as illustrated in FIG. 15, has been used. In the workbook, an examination sentence 1501 is printed in black, an answer 1502 is printed in red or green on the same page, a learner is able to perform smooth learning by moving the examination sentence and the same colored cellophane sheet 1503, making the answer invisible by covering the answer 1502 with the cellophane sheet 1503, and making the answer visible by removing the cellophane sheet 1503 from the answer 1502.

However, for a workbook of this type, a learner should carry the book and a cellophane sheet at the same time. That is, since both hands of the learner are occupied, it is not easy to learn while taking a memo, referring to another book such as a dictionary, or a reference book, or operating a device. In addition, since the user should prepare for an exclusive learning book as contents, it is not possible for the user to learn using his favorite foreign book or foreign magazine.

In contrast to this, according to the technology which is disclosed in the specification, the image display device 1 can display an examination sentence by overlapping an answer therewith when a user views a book in which the answer is not printed in practice. That is, it is possible to make a learner perform smooth learning similarly to the workbook attached with answers 1500 in which the colored cellophane sheet 1503 is used, by overlappingly displaying an answer when the user is checking the answer, without displaying the answer when the user is solving a problem. In addition, it is possible to make the user perform learning by displaying user's favorite foreign book or foreign magazine on the image display device 1. In addition, since both hands of the user wearing the image display device 1 are free, it is easy to learn while taking a memo, referring to another book such as a dictionary, a reference book, or the like, or operating a device.

There are two examples as methods of displaying an examination sentence in a real world by overlapping with an answer using the image display device 1.

Figure 16:
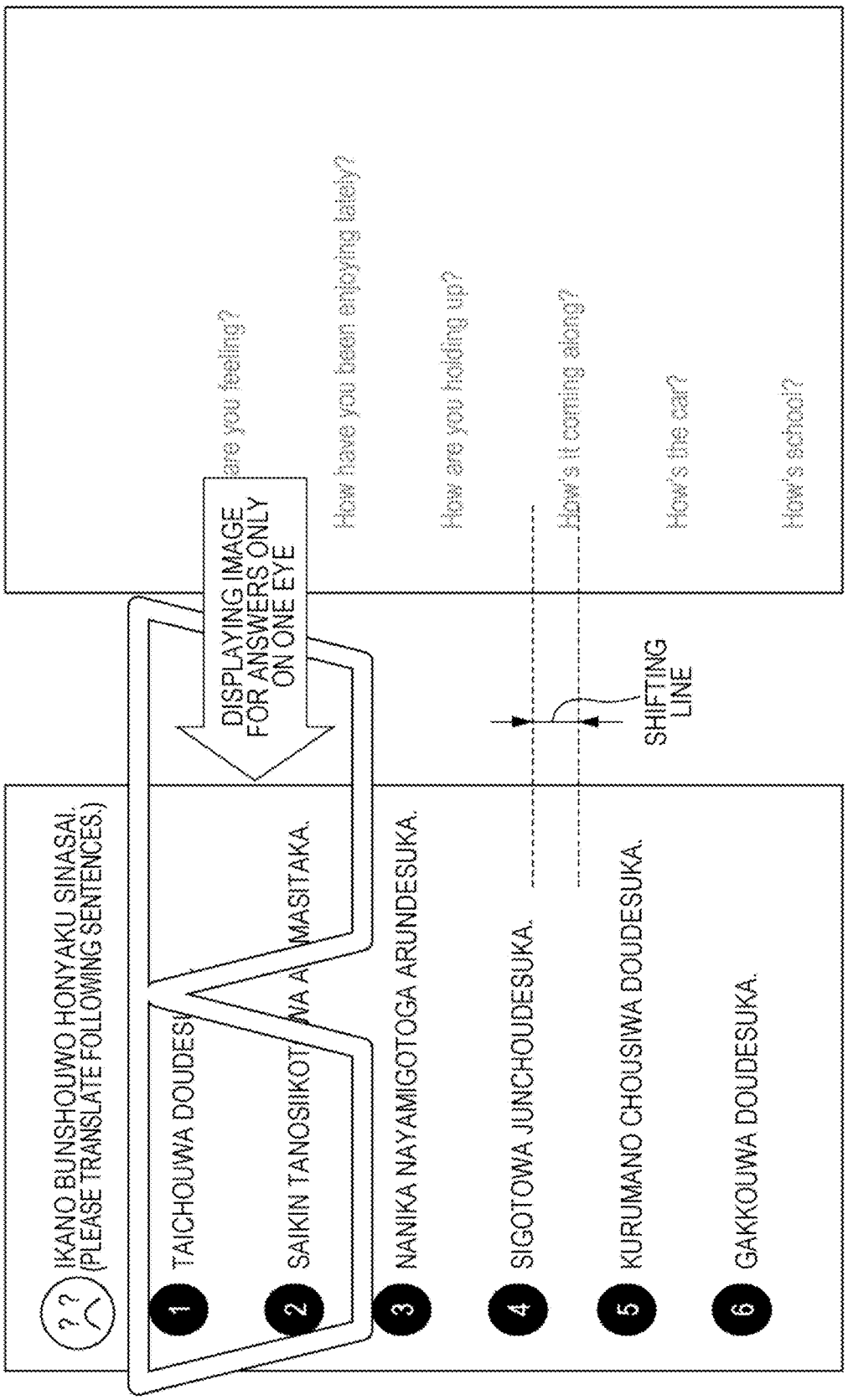
FIG. 16 is a diagram for explaining a first method for displaying an examination sentence in a real world by overlapping with an answer using the image display device.

As a first method, as illustrated in FIG. 16, when a user views a workbook in a real world over the transmission-type image display device, an image for answers is overlappingly displayed only on one side of the left and right display panels. However, in the illustrated example, it is assumed that the image for answers is overlapped on the left display panel therewith. At this time, a position of the image for answers is shifted in the vertical direction so that the answer is shifted in the vertical direction by one line, and so as not to be overlapped with the examination sentence thereon.

Figure 17:
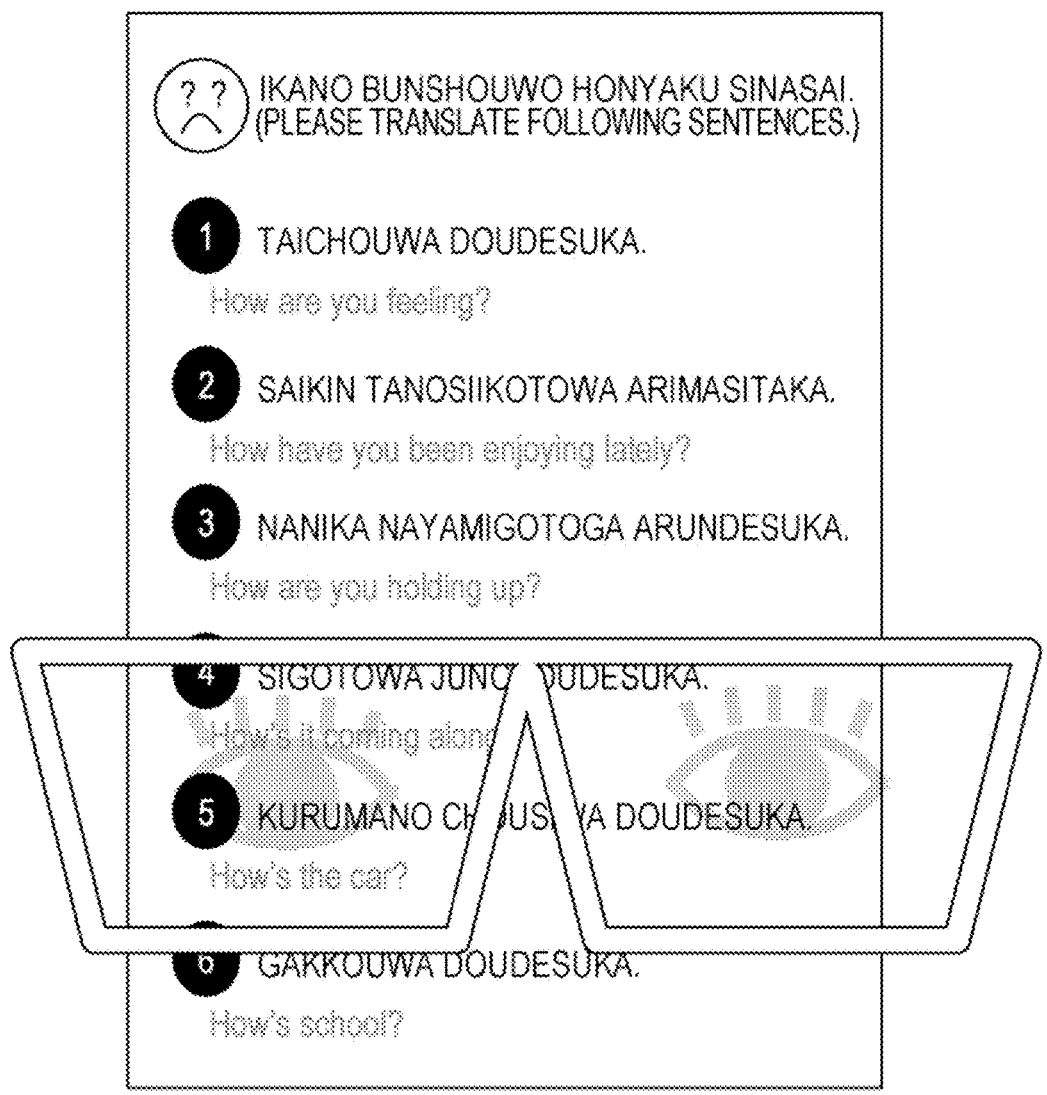
FIG. 17 is a diagram for explaining the first method for displaying the examination sentence in the real world by overlapping with the answer using the image display device.
Figure 18:
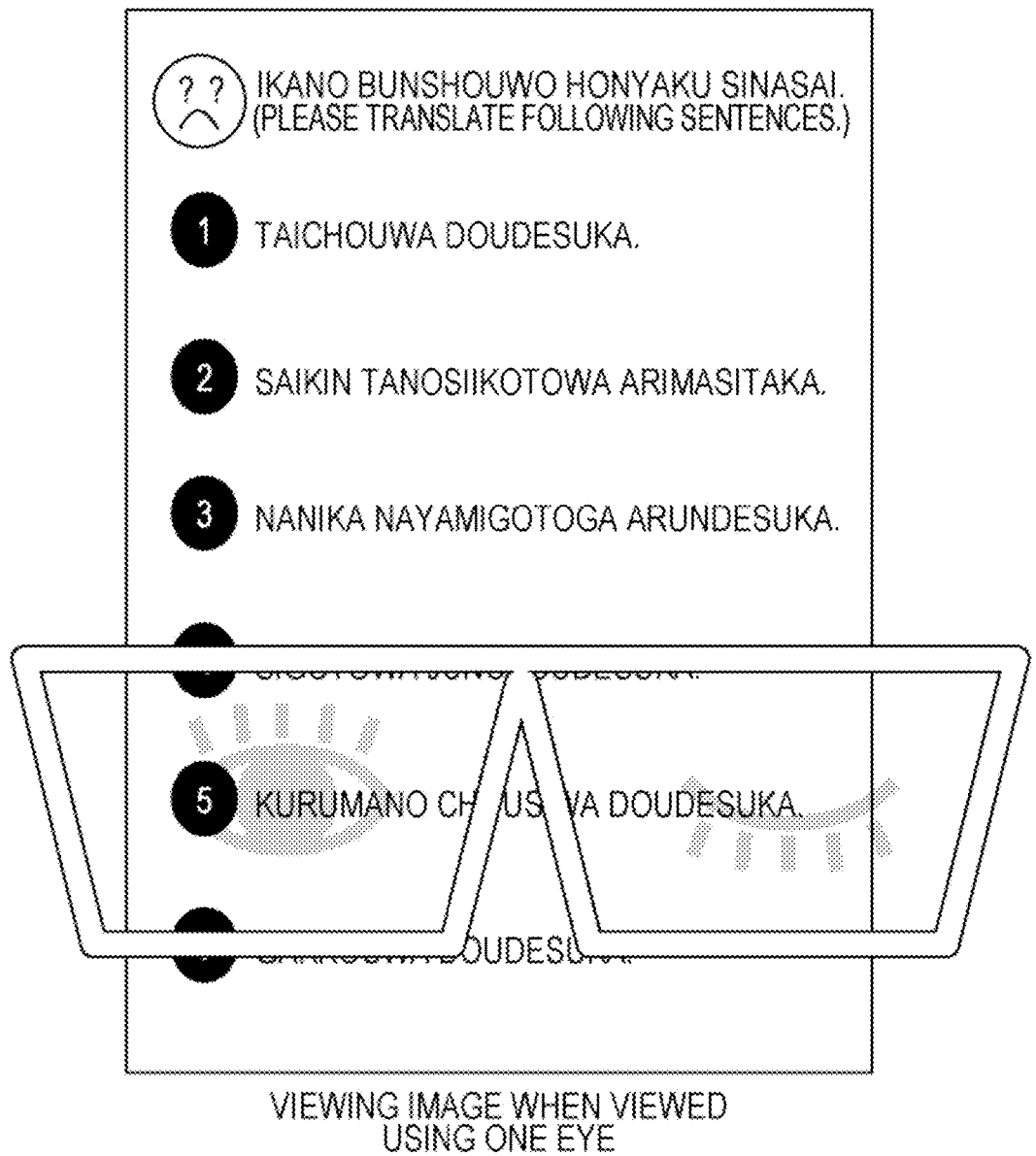
FIG. 18 is a diagram for explaining the first method for displaying the examination sentence in the real world by overlapping with the answer using the image display device.

In such a case, when the user views the workbook using both eyes, as illustrated in FIG. 17, since the answer is overlappingly viewed by being shifted by one line from the examination sentence, it is possible to make the same state as the upper stage in FIG. 16. In addition, when the user views the workbook using one eye by closing an eye on the side on which the answer is displayed, since only the examination sentence is viewed as illustrated in FIG. 18, it is possible to form the same state as that when the cellophane sheet which is illustrated on the lower stage in FIG. 16 is overlapped.

Figure 19:
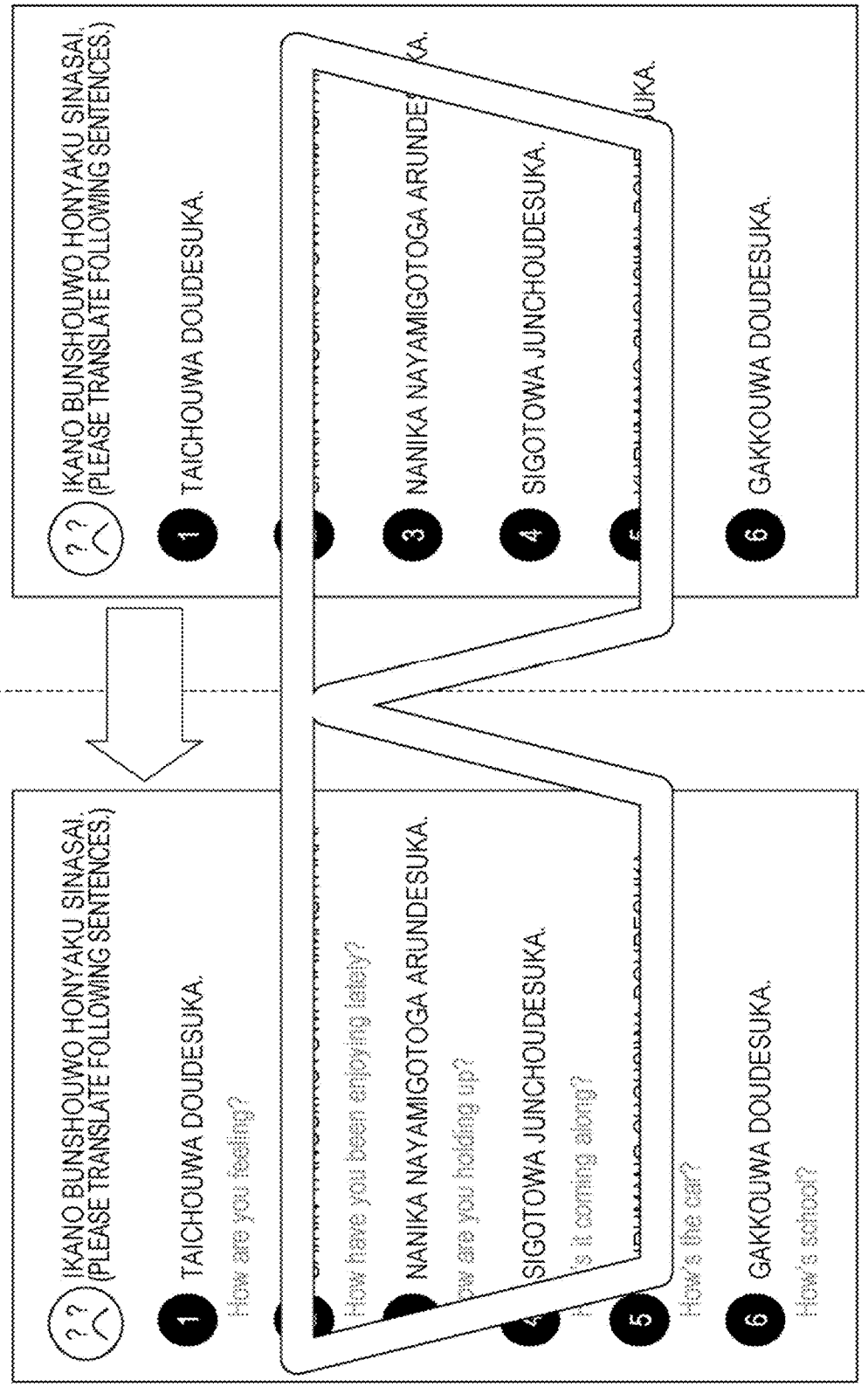
FIG. 19 is a diagram for explaining a second method for displaying the examination sentence in the real world by overlapping with the answer using the image display device.

In addition, as a second method, as illustrated in FIG. 19, an image for answers is displayed only when an examination sentence comes in on one side of the left and right field of visions of a user who is wearing the image display device 1. In the illustrated example, a state is illustrated in which an answer is overlappingly displayed when the examination sentence is present on the left side of a field of vision of the user. Differently from the above described first method, the image for answers may be displayed on both the left and right display panels.

Figure 20:
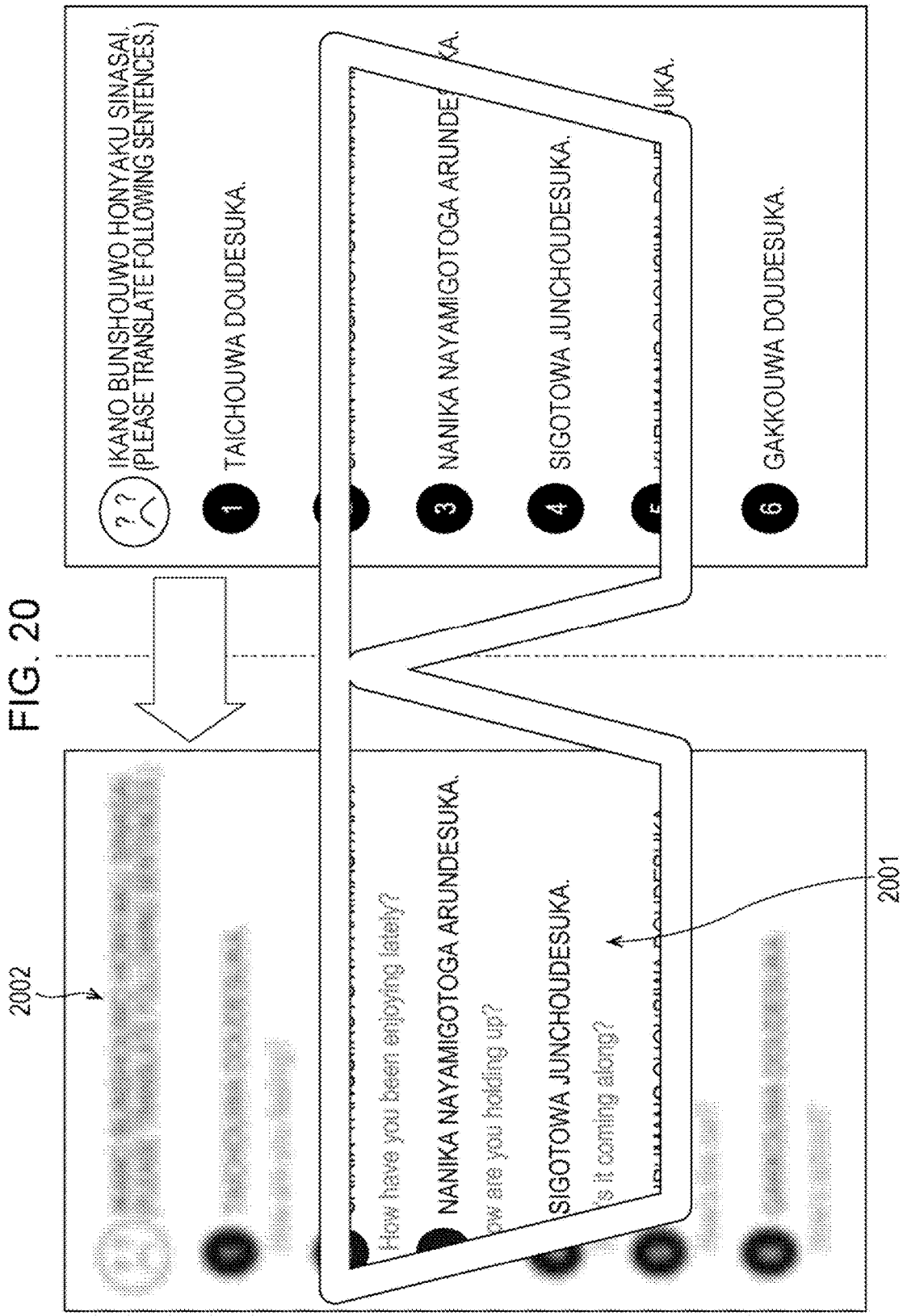
FIG. 20 is a diagram for explaining the second method for displaying the examination sentence in the real world by overlapping with the answer using the image display device.

As described above, in a case in which the answer is overlappingly displayed when the examination sentence is on the left side of the field of vision, there is inconvenience if an answer on another line (that is, examination sentence that user is not solving at present) is viewed in advance. Therefore, in a region excluding a fixation point region 2001 (that is, region user is not viewing) in the vicinity of a center of the image with which the image for answers is overlapped is subject to processing such as applying a blur 2002 as illustrated in FIG. 20, applying mosaic, or the like, and the entire image of the examination sentence attached with answers is caused to be invisible.

Figure 21:
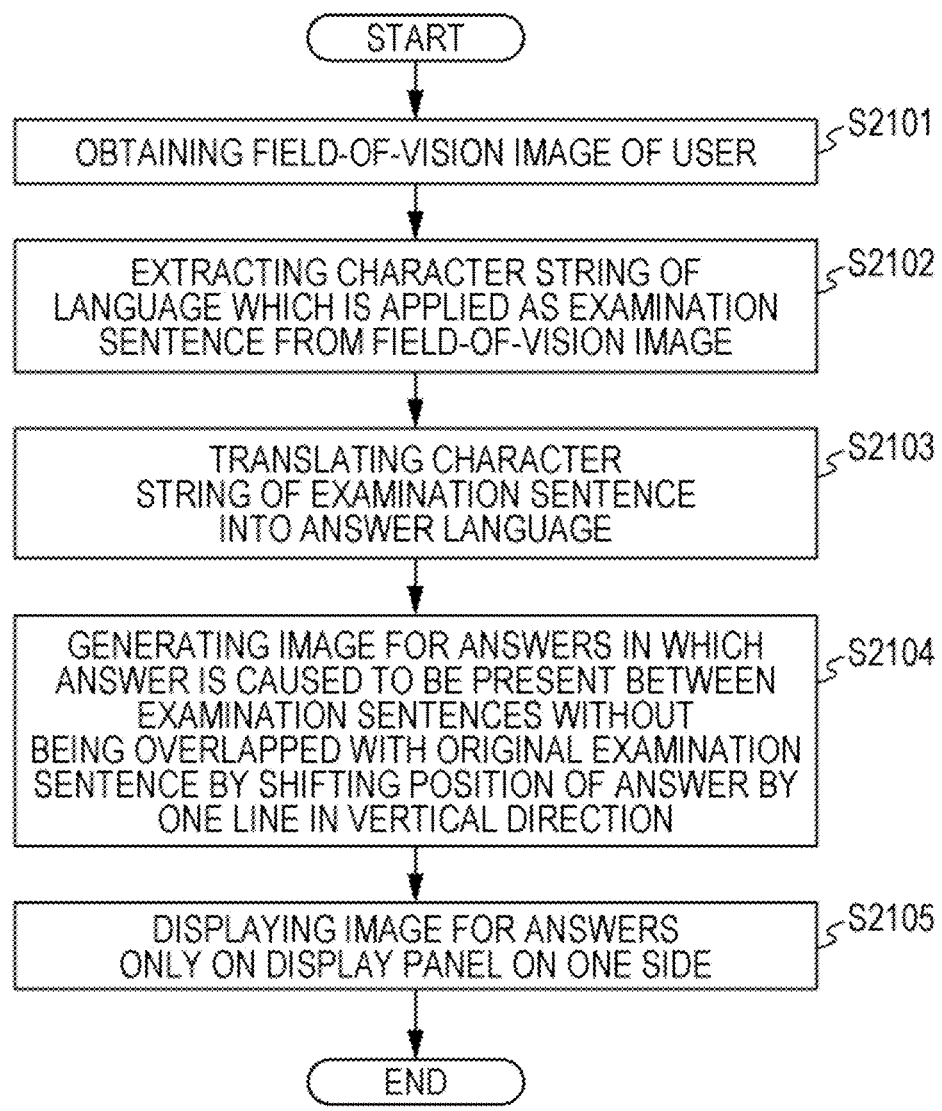
FIG. 21 is a flowchart which illustrates a processing procedure for providing an image of an examination sentence which is attached with an answer by the image display device.

FIG. 21 illustrates a processing procedure of the image display device 1 for providing an image of an examination sentence attached with answers using the above described first method in a form of a flowchart. For example, the image display device 1 transits to an education/learning mode according to a result which detects a work state of a user such as finding an examination sentence in a field-of-vision image of the user which is photographed using an external camera. In the processing procedure which is illustrated in FIG. 21 can be executed, for example, in a form in which the control unit 501 executes an education/learning application program when the image display device 1 transits to the education/learning mode.

First, a field-of-vision image of a user is obtained using an external camera which is included in the environment information obtaining unit 504 (step S2101).

Subsequently, the attention region specifying unit 603 extracts a character string of a language which is applied as an examination sentence from a field of vision of the user as an attention region (step S2102).

When the character string of the language which is extracted as the examination sentence is translated into an answer language (step S2103), the attention region image processing unit 604 generates an image for answers so that the answer is present between examination sentences without being overlapped with an examination sentence in a real world by shifting a position of the answer by one line in the vertical direction (step S2104).

In addition, the display control unit 605 displays the image for answers which is generated in the attention region image processing unit 604 on the display panel 509 on one side between the left and right so as to be overlapped with the original attention region in the field of vision of the user (refer to FIG. 19) (step S2105).

In addition, FIG. 22 illustrates a processing procedure for providing an image of an examination sentence attached with answers using the above described second method which is performed by the image display device 1 in a form of a flowchart. The processing procedure can be executed, for example, in a form in which the control unit 501 executes an education/learning application program when the image display device 1 transits to the education/learning mode.

First, a field-of-vision image of the user is obtained using an external camera which is included in the environment information obtaining unit 504 (step S2201).

Subsequently, the attention region specifying unit 603 extracts a character string of a language which is applied as an examination sentence from a field of vision of the user (step S2202).

When the character string of the language which is extracted as an examination sentence is translated into an answer language (step S2203), the attention region image processing unit 604 generates the image for answers so that the answer is present between examination sentences without being overlapped with an examination sentence in a real world by shifting a position of the answer by one line in the vertical direction (step S2204).

Here, the attention region image processing unit 604 checks whether or not an image of the examination sentence is present only on the left half of the field of vision (step S2205).

When the image of the examination sentence is present field of visions on the left and right eyes (NO, in step S2205), the processing routine is ended.

On the other hand, when the image of the examination sentence is present only on the left half of the field of vision (Yes, in step S2205), the attention region image processing unit 604 generates an image in which the field-of-vision image is overlapped with the image for answers (step S2206). In addition, when a fixation point of the left eye of the user is extracted based on output information of a myoelectricity sensor, an electric eye sensor, or the internal camera which is included in the state information obtaining unit 505 (step S2207), the attention region image processing unit 604 applies a blur on the outer side of the fixation point region of the field-of-vision image (refer to FIG. 20) (step S2208).

In addition, the display control unit 605 displays the image for answers which is generated in the attention region image processing unit 604 on the display panels 509 on both the left and right sides (refer to FIG. 20) (step S2209).

As described above, according to the technology which is disclosed in the specification, the image display device 1 which is used by being mounted on the head of a user is provided so as to be regularly used in a user's lifestyle such as translation of a foreign language, a guidance indication, highlighting of information, an education and learning, and the like, can also acquire big added values in addition to contents viewing. In addition, since the image display device 1 presents information using a method in which only a display of an attention region which comes in a field of vision of a user is changed, it is also referred to as a user interface which is natural, and in which an interface between a machine and a person is insensible. For example, when the image display device 1 includes functions of a multifunctional terminal such as a smart phone, it is also possible to expect that the image display device is widely used by being substituted by the smart phone.

In addition, the technology which is disclosed in the specification can also be configured as follows.

(1) An image display device which is used by being mounted on a head or a face of a user, and includes a display unit which displays an image; an information maintaining unit which maintains user information of the user; a region specifying unit which specifies an attention region from a field of vision of the user based on the user information; an image processing unit which performs image processing with respect to the attention region; and a display control unit which displays the attention region after being subjected to the image processing on the display unit.

(2) The image display device which is disclosed in (1), in which the display unit is a transmission type, and the display control unit displays the attention region after being subjected to the image processing on the display unit so as to be overlapped with a transmitted real attention region in a field of vision of the user.

(3) The image display device which is disclosed in (1), in which the display unit is a light blocking type, and further includes an image obtaining unit which obtains a field-of-vision image of the user, and the display control unit displays the attention region after being subjected to the image processing on the display unit so as to be overlapped with the attention region in the field-of-vision image.

(4) The image display device which is disclosed in (1), in which the information maintaining unit maintains a position of a line of sight of the user as the user information, and the region specifying unit specifies the attention region based on the position of the line of sight of the user.

(5) The image display device which is disclosed in (1), in which the information maintaining unit maintains an action history or a memorandum of the user as the user information, and the region specifying unit specifies the attention region based on the action history or the memorandum of the user.

(6) The image display device which is disclosed in (1), in which the information maintaining unit maintains a work state of the user as the user information, and the region specifying unit specifies the attention region based on the work state of the user.

(7) The image display device which is disclosed in (1), in which the image processing unit performs processes of substituting the attention region to another image, highlighting the attention region, concealment processing of the attention region, or modifying of the attention region.

(8) The image display device which is disclosed in (1), in which the information maintaining unit maintains the position of the line of sight of the user as the user information, the region specifying unit specifies a character string which is written in a source language, and is on the tip of the line of sight of the user as an attention region, the image processing unit translates the character string into a language which is determined based on the user information, and the display control unit displays the original character string in the attention region by substituting to a translated character string.

(9) The image display device which is disclosed in (8), in which the image processing unit generates a substitution image in the original attention region by attaching the translated character string on a background image in which the character string before translating is painted out using peripheral color or texture, and the display control unit displays the image which is generated in the image processing unit so as to be overlapped with the original attention region in the field of vision of the user.

(10) The image display device which is disclosed in (8), in which the image processing unit generates the substitution image in the attention region by providing the substitution image with a translated character, color of the character before translating, a style of font, and an inclination on the background image.

(11) The image display device which is disclosed in (8), in which the image processing unit adjusts a font size of the translated character string so as to be fitted into the original attention region.

(12) The image display device which is disclosed in (8), in which the display control unit sequentially displays the translated character string which is not fitted into the original attention region by scrolling the character string in the arranging direction of the character.

(13) The image display device which is disclosed in (8), in which the image processing unit determines a target language based on a country from which the user has come, a residence of the user, a language which can be understood by the user, or a proficiency level of each language of the user.

(14) The image display device which is disclosed in (8), in which the information maintaining unit maintains current location information the user, and processes in each unit of the region specifying unit, the image processing unit, and the display control unit are performed when the current position is determined to be another country, not a residence country.

(15) The image display device which is disclosed in (8), in which an official language in the current location is set to a source language, and a language of which a proficiency level of the user is the highest is set as the target language.

(16) The image display device which is disclosed in (5), in which the region specifying unit determines important information of the user based on the action history or the memorandum of the user, and specifies the attention region according to a type of the important information which is found in the field of vision of the user.

(17) The image display device which is disclosed in (16), in which the image processing unit applies image processing corresponding to the type of the important information with respect to the attention region.

(18) The image display device which is disclosed in (16), in which the region specifying unit determines a name of a main mark between the current location and a destination, and the mark as the important information according to current transportation means of the user when the user is moving to the destination, and does not have the feel of the place in the current location.

(19) The image display device which is disclosed in (6), in which the region specifying unit specifies an examination sentence in the field of vision of the user in the attention region, the image processing unit generates an image for answers of the examination sentence, and the display control unit displays the image for answers by shifting a position of the answer from the examination sentence so as not to be overlapped with the examination sentence in a real world thereon.

(20) The image display device which is disclosed in (19) in which the display unit is provided in each of the left and right eyes of the user, and in which the display control unit overlappingly displays the image for answers only on one side of the left and right display units.

(21) The image display device which is disclosed in (19) in which the display unit is provided in each of the left and right eyes of the user, and in which the display control unit overlappingly displays the image for answers on both sides of the left and right display units, when the examination sentence is present on one field of vision of both the left and right eyes of the user.

(22) The image display device which is disclosed in (21), in which the display control unit applies a blur or a mosaic to a region excluding a fixation point region in the vicinity of a center of the image with which the image for answers is overlapped.

(23) An image display method in which an image is displayed for a user who is wearing an image display device on the head or a face portion includes maintaining user information of the user; specifying attention region from a field of vision of the user based on the user information; performing image processing with respect to the attention region; and display controlling of displaying the attention region after being subjected to the image processing for the user.

(24) A computer program which is written in a computer-readable format so that an image display device which is used by being mounted on the head or a face portion of a user is controlled using a computer, in which the computer is caused to function as a display unit which displays an image; an information maintaining unit which maintains user information of the user; a region specifying unit which specifies an attention region from a field of vision of the user based on the user information; an image processing unit which performs image processing with respect to the attention region; and a display control unit which displays the attention region after being subjected to the image processing on the display unit.

Basically, the technology which is disclosed in the specification has been described in a form of exemplifications, the descriptions of the specification are not construed by being limited, and scope of claims should be considered in order to determine the scope of the technology which is disclosed in the specification.

What is claimed is:

1. An image display device which is used by being mounted on a head or a face of a user, the device comprising:
   a display unit which displays an image;
   an information maintaining unit which maintains user information of the user;
   a region specifying unit which specifies an attention region from a field of vision of the user based on the user information, in which the attention region represents a region external to the image display device which is viewed by the user;
   an image processing unit which performs image processing with respect to the attention region; and
   a display control unit which displays the attention region after being subjected to the image processing on the display unit,
   the region specifying unit further configured to determine important information from the user information and to specify the attention region according to a type of the important information found in the field of vision of the user, wherein the region specifying unit determines the important information automatically based on at least (i) obtaining a current location of the user, (ii) obtaining a residence of the user, (iii) comparing the current location of the user to the residence of the user, and (iv) when the current location does not match the residence, using an action history of the user to determine whether the user has previously visited the current location more than one time, and wherein the region specifying unit specifies the attention region according to at least one of the following found in the field of vision of the user: exit guidance, a guide board, a road display, a transfer station, a home number, a name of an intersection, a logo, or a signboard, and
   the image processing includes a drawing process based on the type of the important information such that the image processing unit is configured to apply the drawing process to the attention region in accordance with the type of the important information.

2. The image display device according to the claim 1,
   wherein the region specifying unit specifies a character string which is written in a source language as the attention region,
   wherein the image processing unit translates the character string into a language which is determined based on the user information, and
   wherein the display control unit displays an original character string in the attention region by substituting to a character string which is translated.

3. The image display device according to claim 2,
   wherein the image processing unit generates an image to be substituted in the original attention region by attaching the translated character string onto a background image on which the character string before translating is painted out using peripheral color or texture, and
   wherein the display control unit displays the image which is generated in the image processing unit so as to overlap with the original attention region in the field of vision of the user.

4. The image display device according to claim 2,
   wherein the image processing unit generates the image to be substituted in the attention region by providing the substitution image with a translated character, color of the character before being translated, a style of font, and an inclination on the background image.

5. The image display device according to claim 2,
   wherein the image processing unit of the image display device adjusts a font size of the translated character string so as to be fitted into the original attention region.

6. The image display device according to claim 2,
   wherein the display control unit sequentially displays the translated character string which is not fitted into the original attention region by scrolling the character string in the arranging direction of the character.

7. The image display device according to claim 2,
   wherein the image processing unit determines a target language based on a country from which the user has come, a residence of the user, a language which can be understood by the user, or a proficiency level of each language of the user.

8. The image display device according to claim 2,
   wherein the image maintaining unit maintains current location information of the user, and
   wherein processes of each unit of the region specifying unit, the image processing unit, and the display control unit are performed when the current location is determined to be another country excluding a country of residence.

9. The image display device according to claim 2,
   wherein an official language of the current location is set to a source language, and a language of the user of which a proficiency level is highest is set to the target language.

10. The image display device according to claim 1,
    the information maintaining unit maintains the action history or a memorandum of the user as the user information wherein.

11. The image display device according to claim 1,
    wherein the region specifying unit determines a name of a main mark between the current location and a destination, and the mark as the important information according to current transportation means of the user, when the user is moving to the destination, and the current location is unfamiliar to the user.

12. The image display device according to claim 1, wherein the information maintaining unit maintains a work state of the user as the user information, in which the work state is indicative of a type of work being performed by the user.

13. The image display device according to claim 12, wherein, in the work state in which the user is solving problems on a workbook,
the region specifying unit specifies an examination sentence in the field of vision of the user in the attention region;
the image processing unit generates an image to accommodate an anticipated answer of the examination sentence; and
the display control unit displays the image for answers by shifting a position of the answer from the examination sentence so as not to be overlapped with the examination sentence in the real world thereon.

14. The image display device according to claim 12, wherein the display unit is provided in each of left and right eyes of the user, and
wherein the display control unit overlappingly displays the image for answers only on one side of the left and right display units.

15. The image display device according to claim 12, wherein the display unit is provided in each of the left and right eyes of the user, and
wherein the display control unit overlappingly displays the image to accommodate the anticipated answer on both sides of the left and right display units when the examination sentence is present in the field of vision on one side of the left and right eyes of the user.

16. The image display device according to claim 15, wherein the display control unit applies a blur or a mosaic to a region the user is not viewing.

17. An image display method in which an image is displayed for a user who is wearing an image display device on the head or face, the method comprising:
maintaining user information of the user;
determining important information from the user information and specifying an attention region according to a type of the important information found in a field of vision of the user, in which the attention region represents a region external to the image display device which is viewed by the user, wherein the determining the important information is performed automatically by at least (i) obtaining a current location of the user, (ii) obtaining a residence of the user, (iii) comparing the current location of the user to the residence of the user, and (iv) when the current location does not match the residence, using an action history of the user to determine whether the user has previously visited the current location more than one time, and wherein specifying the attention region comprises specifying the attention region according to at least one of the following found in the field of vision of the user: exit guidance, a guide board, a road display, a transfer station, a home number, a name of an intersection, a logo, or a signboard;
performing image processing with respect to the attention region; and
display controlling of displaying the attention region which is subject to the image processing for the user, the image processing includes a drawing process based on the type of the important information such that the performing includes applying the drawing process to the attention region in accordance with the type of the important information.

18. A non-transitory computer readable medium having stored thereon a computer program which is written in a computer-readable format so that an image display device which is used by being mounted on the head or a face portion of a user is controlled using a computer, the program causing the computer to function as:
a display unit which displays an image;
an information maintaining unit which maintains user information of the user;
a region specifying unit which determines important information from the user information and specifies an attention region according to a type of the important information found in a field of vision of the user, in which the attention region represents a region external to the image display device which is viewed by the user, wherein the region specifying unit determines the important information automatically based on at least (i) obtaining a current location of the user, (ii) obtaining a residence of the user, (iii) comparing the current location of the user to the residence of the user, and (iv) when the current location does not match the residence, using an action history of the user to determine whether the user has previously visited the current location more than one time, and wherein the region specifying unit specifies the attention region according to at least one of the following found in the field of vision of the user: exit guidance, a guide board, a road display, a transfer station, a home number, a name of an intersection, a logo, or a signboard;
an image processing unit which performs image processing with respect to the attention region; and
a display control unit which displays the attention region which is subject to the image processing on the display unit,
the image processing includes a drawing process based on the type of the important information such that during operation the image processing unit applies the drawing process to the attention region in accordance with the type of the important information.

19. The image display device according to claim 1, wherein the information maintaining unit is configured to maintain a memorandum of the user as the user information, in which the memorandum includes a reminder item for the user, and
wherein the region specifying unit is configured (i) to analyze the field of vision of the user to determine if information or an object relating to the reminder item is in the field of vision, and (ii) upon determining that the related information or object is in the field of vision, to highlight a region pertaining to the related information or object as the attention region.

20. The image display device according to claim 1, in which to determine the important information from the user information the region specifying unit is configured to perform a determination process which includes
(i) performing a first determining as to whether the image display device used by the user is moving,
(ii) if the first determining indicates that the image display device is moving, performing a first predetermined process pertaining to a current location of the user to determine if the important information is present and if the important information is determined to be present, to specify the same as the important information, (iii) if the first determining indicates that the image display device is not moving, performing a second determining as to whether an item is present in a memorandum of the user as the user information,
(iv) if the second determining indicates that the item is present in the memorandum, performing a third determining as to whether the item relates to a person or relates to a thing or an action, and
(v) if the third determining indicates that the item relates to the person or to the thing or the action, specifying the important information pertaining thereto.

21. The image display device according to claim 20, wherein the region specifying unit is configured to perform a weighing process on each said specified important information if more than one specified information is specified, in which the weighting process is based on closeness to a time limit.

\* \* \* \* \*